US012777164B2

(12) United States Patent
Andrivon et al.

(10) Patent No.: US 12,777,164 B2
(45) Date of Patent: Oct. 27, 2026

(54) METHOD AND APPARATUS FOR DIMD POSITION DEPENDENT BLENDING

(71) Applicant: Beijing Xiaomi Mobile Software Co., Ltd., Beijing (CN)

(72) Inventors: Pierre Andrivon, Beijing (CN); Fabrice Leléannec, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 18/853,631

(22) PCT Filed: Mar. 3, 2023

(86) PCT No.: PCT/CN2023/079675
§ 371 (c)(1),
(2) Date: Oct. 2, 2024

(87) PCT Pub. No.: WO2023/193556
PCT Pub. Date: Oct. 12, 2023

(65) Prior Publication Data

US 2025/0227246 A1 Jul. 10, 2025

(30) Foreign Application Priority Data

Apr. 7, 2022 (EP) .................................... 22167223

(51) Int. Cl.
*H04N 19/159* (2014.01)
*H04N 19/11* (2014.01)
(Continued)

(52) U.S. Cl.
CPC ........... *H04N 19/159* (2014.11); *H04N 19/11* (2014.11); *H04N 19/44* (2014.11); *H04N 19/593* (2014.11); *H04N 19/70* (2014.11)

(58) Field of Classification Search
CPC ...... H04N 19/159; H04N 19/11; H04N 19/44; H04N 19/593; H04N 19/70
See application file for complete search history.

(56) References Cited

U.S. PATENT DOCUMENTS

2017/0353719 A1 12/2017 Liu et al.
2019/0215521 A1* 7/2019 Chuang ................ H04N 19/105
(Continued)

FOREIGN PATENT DOCUMENTS

EP 3962080 A1 3/2022
WO WO-2018054269 A1 * 3/2018 ............. H04N 19/11
(Continued)

OTHER PUBLICATIONS

Abdoli et al. "Decoder-Side Intra Mode Derivation For Next Generation Video Coding" 2020 IEEE ICME, DOI: 10.1109/ICME46284.2020.9102799, Jul. 6-10, 2020 (Year: 2020).*
(Continued)

*Primary Examiner* — Richard A Hansell, Jr.
(74) *Attorney, Agent, or Firm* — Finnegan, Henderson, Farabow, Garrett & Dunner, L.L.P.

(57) ABSTRACT

A method of deriving a Decoder-side Intra Mode Derivation (DIMD) predictor for respective samples of a coding unit (CU) of a picture, includes: selecting one or more Intra Prediction Modes (IPMs) in a template area adjacent to the CU; for each sample of the CU, determining, dependent on a distance of the sample of the CU to the template area, blending weights for blending at least the one or more selected IPMs; and generating the DIMD predictor by blending the one or more selected IPMs and a Planar or DC mode using the determined blending weights.

17 Claims, 17 Drawing Sheets

(51) Int. Cl.

| | |
|---|---|
| ***H04N 19/44*** | (2014.01) |
| ***H04N 19/593*** | (2014.01) |
| ***H04N 19/70*** | (2014.01) |

(56) References Cited

U.S. PATENT DOCUMENTS

| | | | | |
|---|---|---|---|---|
| 2024/0223757 | A1* | 7/2024 | Wang | H04N 19/11 |
| 2024/0236336 | A1* | 7/2024 | Xu | H04N 19/159 |
| 2024/0275984 | A1* | 8/2024 | Zhang | H04N 19/154 |
| 2024/0348777 | A1* | 10/2024 | Jhu | H04N 19/11 |
| 2025/0016347 | A1* | 1/2025 | Jhu | H04N 19/105 |

FOREIGN PATENT DOCUMENTS

| | | | | |
|---|---|---|---|---|
| WO | WO-2023154359 | A1 * | 8/2023 | H04N 19/11 |
| WO | WO-2025145009 | A1 * | 7/2025 | H04N 19/82 |

OTHER PUBLICATIONS

European Search Report for EP application 22167223.1, dated Sep. 9, 2024.

International Search Report and Written Opinion for PCT application No. PCT/CN2023/079675, dated May 25, 2023.

* cited by examiner

METHOD AND APPARATUS FOR DIMD POSITION DEPENDENT BLENDING

CROSS-REFERENCE TO RELATED APPLICATIONS

This application is a US national phase application of International Application No. PCT/CN2023/079675, filed on Mar. 3, 2023, which is based on and claims priority to European Patent Application No. 22167223.1, filed on Apr. 7, 2022, the entire content of both of which is incorporated herein by reference.

TECHNICAL FIELD

The present disclosure generally relates to the field of encoding/decoding pictures, images or videos, and embodiments of the present disclosure concern improvements regarding the Intra prediction, more specifically, improvements regarding a decoder-side intra mode derivation, DIMD, process. More specific embodiments of the present disclosure relate to a DIMD position dependent blending.

BACKGROUND

The encoding and decoding of a picture, an image or a video is performed in accordance with a certain standard, for example, in accordance with the advanced video coding, AVC standard, the high efficiency video coding, HEVC, standard or the versatile video coding. VVC, standard.

SUMMARY

The present disclosure provides a method of deriving a Decoder-side Intra Mode Derivation, DIMD, predictor for respective samples of a coding unit, CU, of a picture, the method including:

- selecting one or more Intra Prediction Modes, IPMs, in a template area adjacent to the CU,
- for each sample of the CU, determining, dependent on a distance of the sample of the CU to the template area, blending weights for blending at least the one or more selected IPMs, and
- generating the DIMD predictor by blending the one or more selected IPMs and a Planar or DC mode using the determined blending weights.

The present disclosure provides a non-transitory computer-readable storage medium comprising instructions which, when executed by a computer, cause the computer to carry out the inventive method.

The present disclosure provides an apparatus for deriving a Decoder-side Intra Mode Derivation, DIMD, predictor for respective samples of a coding unit, CU, of a picture, the apparatus configured to:

- select one or more IPMs in a template area adjacent to the CU,
- determine, for each sample of the CU, dependent on a distance of the sample of the CU to the template area, blending weights for blending at least the one or more selected IPMs, and
- generate the DIMD predictor by blending the one or more selected IPMs and a Planar or DC mode using the determined blending weights provided by the blending weight determination module.

BRIEF DESCRIPTION OF THE DRAWINGS

The drawings are explanatory and serve to explain the present disclosure, and are not to be construed to limit the present disclosure to the illustrated embodiments.

DETAILED DESCRIPTION

Illustrative embodiments of the present disclosure are described below with reference to the drawings, where various details of the embodiments of the present disclosure are included to facilitate understanding and is to be considered as illustrative only. Accordingly, those of ordinary skill in the art recognizes that various changes and modifications of the embodiments described herein may be made without departing from the scope of the present disclosure. Also, descriptions of well-known functions and constructions are omitted from the following description for clarity and conciseness.

In the present disclosure, the term "and/or" is intended to cover all possible combinations and sub-combinations of the listed elements, including any one of the listed elements alone, any sub-combination, or all of the elements, and without necessarily excluding additional elements.

In the present disclosure, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present disclosure, the term "coding" refers to "encoding" or to "decoding" as becomes apparent from the context of the described embodiments. Likewise, the term "coder" refers to "an encoder" or to "a decoder".

Figure 1:
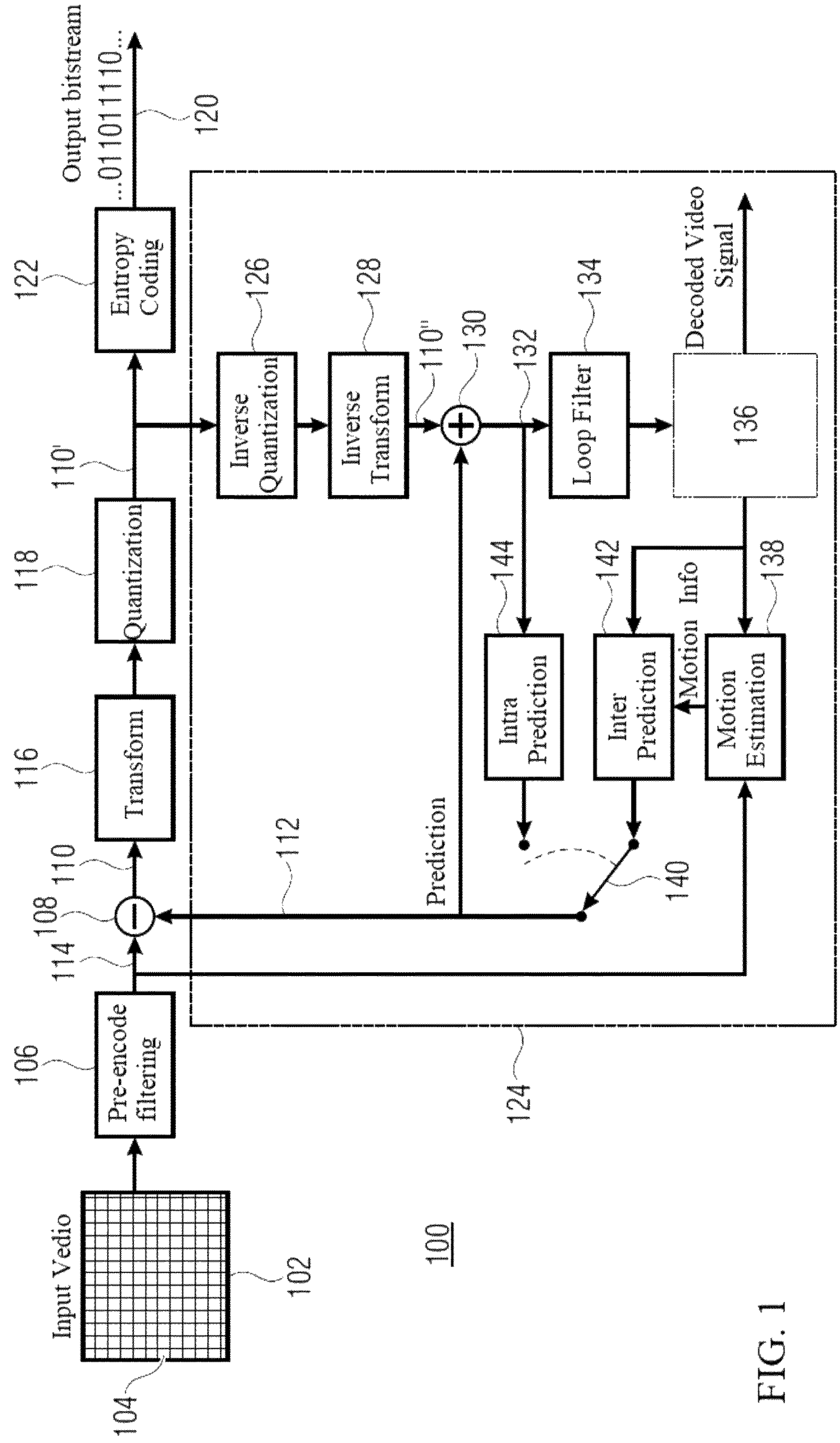
FIG. 1 is a block diagram of a conventional video encoder.

A block diagram of a standard video compression system 100 operating in accordance with the VVC standard is illustrated in FIG. 1. The standard video coder 100 compresses and encodes a picture 102 of a video sequence. The picture 102 to be encoded is partitioned into blocks 104 also referred to as coding units, CUs. The encoder 100 includes a pre-encode filter 106 and a prediction residual signal former 108 which generates a prediction residual signal 110 so as to measure a deviation of a prediction signal 112 from the signal 114 output by the filter 106. The encoder further includes a transformer 116, a quantizer 118 and provides an output bitstream or data stream 120 using an entropy coder 122. Further, the encoder 100 includes a prediction stage 124 for determining the prediction signal 112, which includes a de-quantizer or inverse quantizer 126, an inverse transformer 128, a combiner 130, an in-loop filter 134, a motion estimator 138, an intra/inter mode selector 140, an inter predictor 142 and an intra predictor 144.

The video coder 100 as described with reference to FIG. 1 compresses and encodes a picture 102 of a video sequence as follows. The picture 102 to be encoded is partitioned into the blocks or CUs 104. Each coding unit 104 is encoded using either an intra or inter coding mode. When a CU is encoded in the intra mode, intra prediction is performed by the intra predictor 144. The intra prediction includes predicting the current CU 114 being encoded by means of already coded, decoded and reconstructed picture samples located around the current CU, e.g., on the top and on the left of the current CU. The intra prediction is performed in the spatial domain. In an inter mode, motion compensation and motion estimation are performed by the motion estimator 138 which searches, in one or more reference pictures provided by the picture buffer 136 and used to predictively code the current picture, a CU that is a good predictor of a current CU. For example, a good predictor of a current CU is a predictor which is similar to the current CU, i.e., the distortion between the two CUs is low or below a certain threshold. The motion estimation may also account for the rate cost of signaling the predictor to optimize a rate-distortion tradeoff. The output of the motion estimation step is one or more motion vectors and reference indices associated with the current CU. The motion compensation then predicts the current CU by means of the one or more motion vectors and reference pictures indices as determined by the motion estimator 138. Basically, the block or CU contained in the selected reference picture and pointed to by the determined motion vector is used as the prediction block for the current CU. The encoder 100, by means of the selector 140, selects one of the intra coding mode or the inter coding mode to use for encoding the CU and indicates the intra/inter decision, for example, by means of a prediction mode flag. Prediction residuals 110 are then transformed and quantized by blocks 116 and 118, and the quantized transform coefficients as well as the motion vectors and other syntax elements are entropy encoded and written into the output bitstream 120. The encoder 100 may skip the transform stage 116 and apply the quantization directly to the non-transformed residual signal 110 in a so-called transform-skip coding mode. After a block or CU has been encoded, the encoder decodes the CU and reconstructs it so as to obtain the reconstructed signal 132 that may serve as a reference data for predicting future CUs or blocks to encode. The quantized transform coefficients 110' are de-quantized and inverse transformed leading to a decoded prediction CU or block 110", and the decoded prediction residuals and the predicted block are then combined at 130, typically summed, so as to provide the reconstructed block or CU 132. The in-loop filters 134 are applied to the reconstructed picture to reduce compensation artifacts. For example, a deblocking filter, a sample adaptive offset, SAO, filter, and an adaptive loop filter, ALF, may be applied to reduce encoding artifacts. The filtered picture is stored in the buffer 136, also referred to as the decoded picture buffer, DPB, so that it may be used as a reference picture for coding subsequent pictures.

Figure 2:
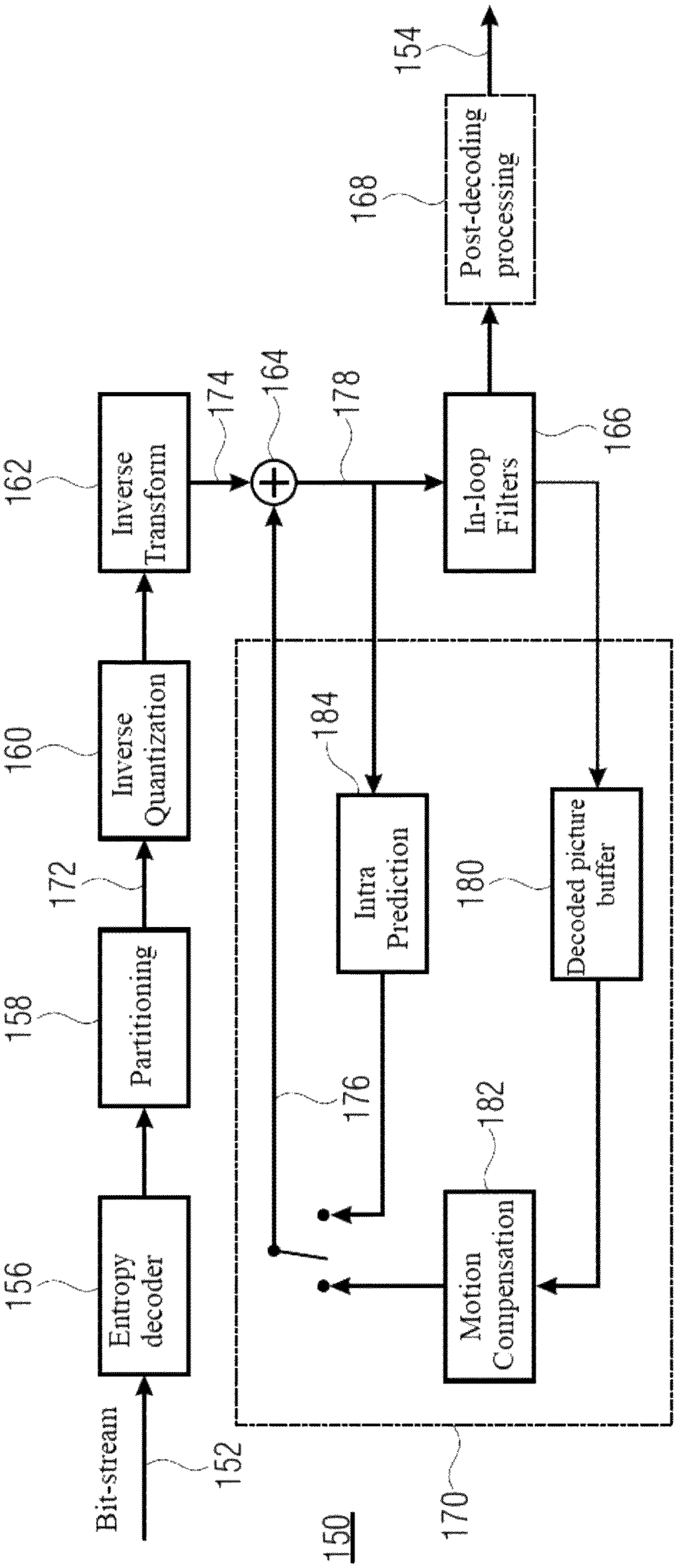
FIG. 2 is a block diagram of a conventional video decoder.

FIG. 2 is a block diagram of a video decoder 150 for predictively decoding from a data stream 152 a picture or video which is provided at an output 154 of the decoder 150. The decoder 150 includes an entropy decoder 156, a partitioning block 158, an inverse quantizer 160, an inverse transformer 162, a combiner 164, an in-loop filter 166, optionally a post-decoding processor 168, and a prediction module 170. The prediction module 170 includes a decoded picture buffer 180 a motion compensator 182 an intra predictor 184.

An encoded picture of a video sequence is decompressed and decoded by the decoder 150 as follows. The input bit stream 152 is entropy decoded by the decoder 156 which provides, for example, the block partitioning information, the coding mode for each coding unit, the transform coefficients contained in each transform block, prediction information, like intra prediction mode, motion vectors, reference picture indices, and other coding information. The block partitioning information indicates how the picture is partitioned and the decoder 150 may divide the input picture into coding tree units, CTUs, typically of a size of 64×64 or 128×128 pixels and divide each CTU into rectangular or square coding units, CUs, according to the decoded partitioning information. The entropy decoded quantized coefficients 172 are de-quantized 160 and inverse transformed 162 so as to obtain the decoded residual picture or CU 174. The decoded prediction parameters are used to predict the current block or CU, i.e., whether the predicted block is to be obtained through its intra prediction or through its motion-compensated temporal prediction. The prediction process performed at the decoder side is the same as the one performed at the encoder side. The decoded residual blocks 174 are added to the predicted block 176, thereby yielding the reconstructed current image block 164. The in-loop filters 166 are applied to the reconstructed picture or image which is also stored in the decoded picture buffer 180 to serve with the reference picture for future pictures to decode. As mentioned above, the decoded picture may further go through a post-decoding processing, for example for performing an inverse color transformation, for example a conversion from YCbCr 4:2:0 to RGB 4:4:4.

As mentioned above, the intra prediction mode to be employed for decoding may be carried in the bit stream provided by the encoder and received by the decoder, however, in accordance with other approaches, rather than introducing the actual intra prediction mode into the bit stream, the intra prediction mode may also be derived by using a gradient analysis of reconstructed pixels neighboring a currently processed CU. In other words, the intra prediction mode is not explicitly indicated in the bit stream but is implicit. This approach is referred to as decoder-side intra mode derivation, DIMD, which may be signaled using a simple flag, and the actual intra mode is then derived during the reconstruction process, like the reconstruction process performed by the prediction block 124/170 of the encoder 100 or the decoder 150. The encoder 100 may encode into the bit stream 120 information whether DIMD is used or not for the current CU, and in case DIMD is not used, the actual intra mode is signaled by the encoder and parsed from the bit stream by the decoder.

Figure 3:
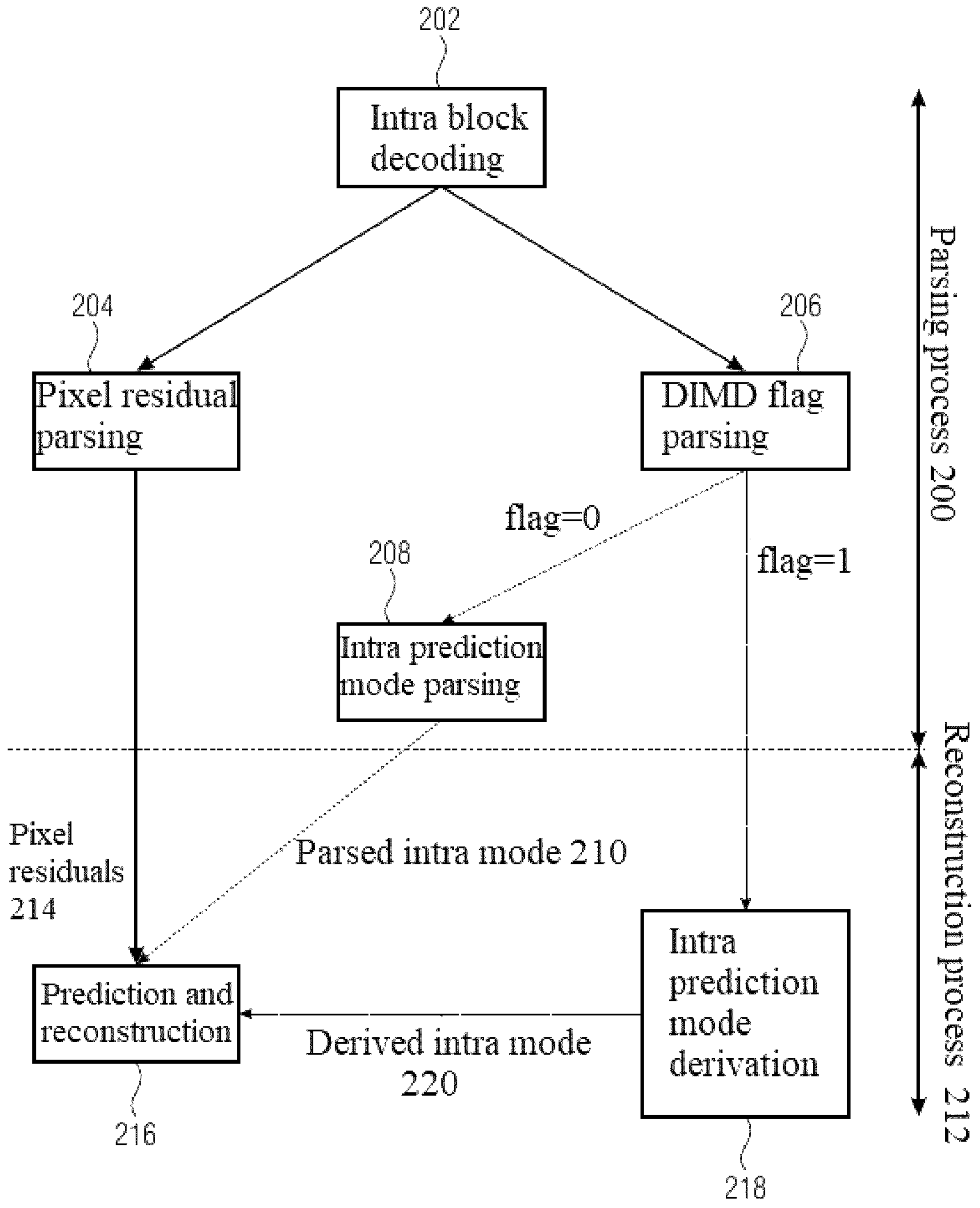
FIG. 3 illustrates an example of an intra block general reconstruction process as it may be applied at the encoder of FIG. 1 or at the decoder of FIG. 2.

FIG. 3 illustrates an example of an intra block general reconstruction process as it may be applied at the encoder 100 or at the decoder 150. During a parsing process 200, an intra block decoding is determined, as indicated at block 202, and a pixel residual parsing 204 as well as a DIMD flag parsing 206 is performed. In case the DMID flag 206 is zero, an intra prediction mode parsing 208 is performed so as to obtain the intra mode 210 to be used during the reconstruction process 212 when predicting and reconstructing a pixel, as is indicated at 216. In case the DIMD flag 206 is set to one, the intra prediction derivation 218 is performed during the reconstruction process 212 which yields the derived intra mode 220 which is used, together with the pixel residuals 214 at 216, for the reconstruction process.

Figure 4:
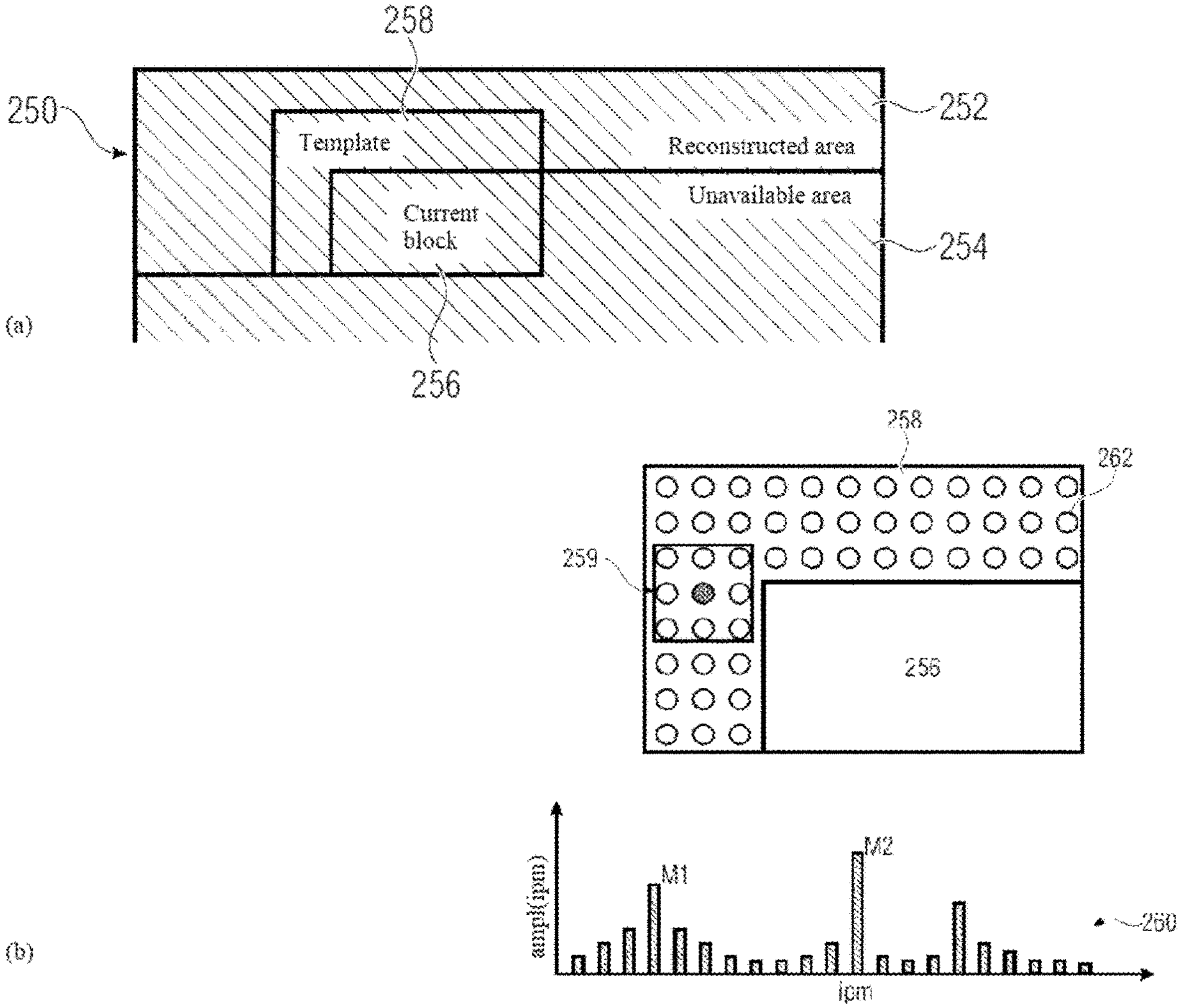
FIG. 4 illustrates a DIMD template area or zone used for computing a Histogram of Gradients, HoG, in the DIMD process.

Further details of the DIMD approach are described. Conventionally, the DIMD process is based on a reconstructed template area adjacent to a currently processed CU which is three samples wide in width and height. The template area includes a left area, an above area and an above-left area. These areas are also referred to in the following as a left template area region, an above template area region and an above-left template area region. In the template area respective edge detection filters, like 3×3 horizontal and vertical Sobel filters, are applied in order to determine the amplitude and angle of luminance directions or orientations for each middle line sample of the template area. A Histogram of Gradients, HoG, is computed, and each entry corresponds to a conventional intra angular mode and the cumulated intensities are stored:

$$\text{angle} = \arctan\left(G_{hor}/G_{ver}\right)$$

$$\text{amplitude} = |G_{hor}| + |G_{ver}|$$

with $G_{hor}$ and $G_{ver}$ being the intensity of pure horizontal and vertical directions as calculated by the Sobel filters. FIG. 4 illustrates the DIMD template area or zone used for computing the HoG. FIG. 4(*a*) illustrates a partially reconstructed picture 250 as indicated by the reconstructed area 252 and the unavailable area 254. In other words, a reconstructed area 252 includes already reconstructed coding units or blocks of the picture to be reconstructed, while the respective coding units or blocks in the unavailable area 254 are still to be reconstructed. A currently processed CU or block 256 is illustrated as well as the above mentioned template area 258. FIG. 4(*b*) illustrates that the template area 258 is 3 samples or pixels wide in width and height, and that a 3×3 horizontal and vertical Sobel filter 259 is used, as described above, to compute the HoG 260 so as to obtain on the basis of the amplitude and angle of luminance directions for each middle line sample 262 of the template area 258 an intra angular prediction mode, also referred to as intra prediction mode, IPM, and for each IPM in the template area an associated cumulated intensity or amplitude. The two most represented IPMs, indicated as $M_1$ and $M_2$ in FIG. 4(*b*), are selected from the HoG 260 and are combined with a Planar mode using weights for $M_1$ and $M_2$ derived from a ratio of their cumulated amplitudes, and a fixed weight for the Planar mode, for example 1/3, i.e., 21/64 with a 6 bit integer precision.

Figure 5:
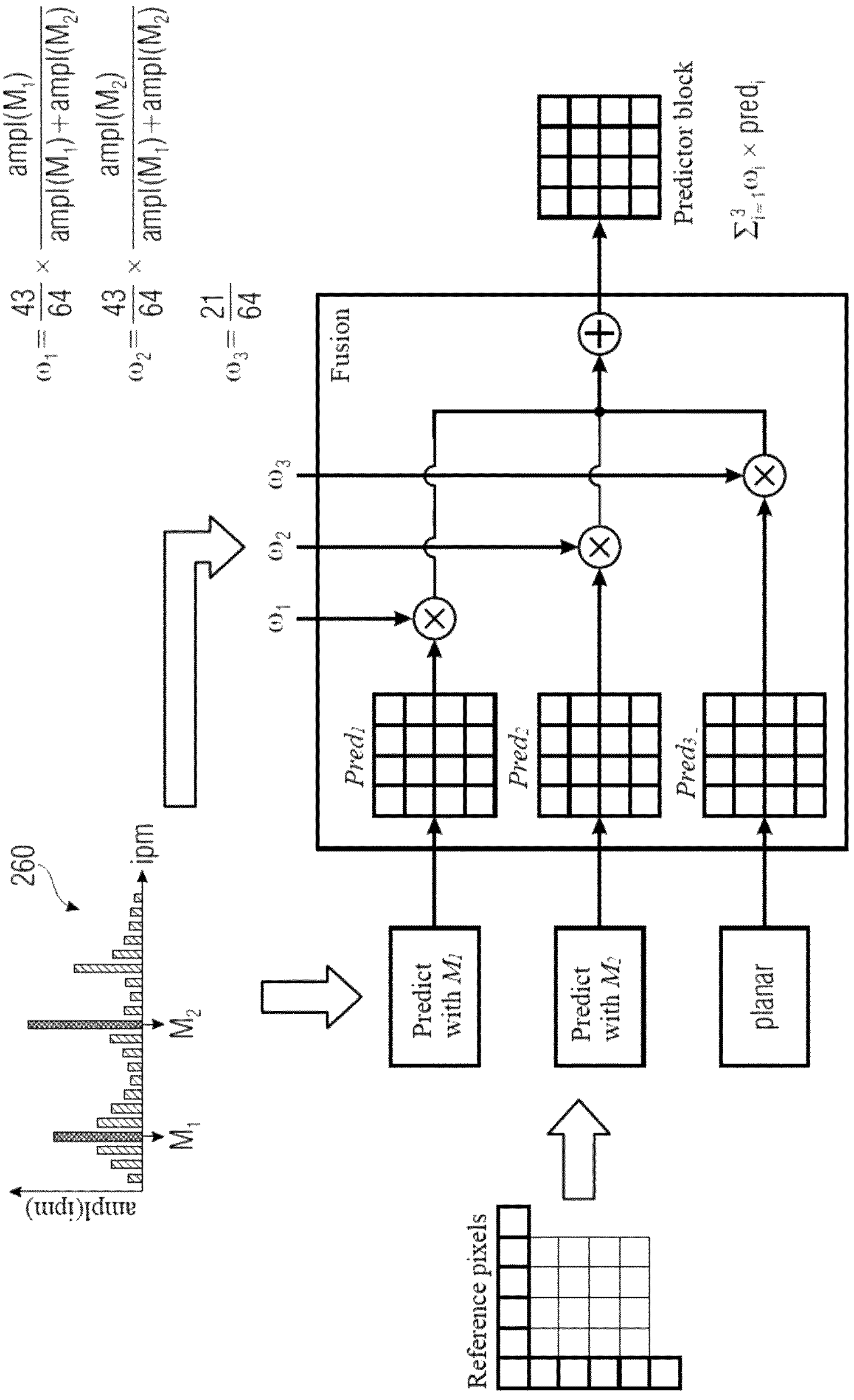
FIG. 5 illustrates the prediction fusion by weighted averaging of selected IPMs and a Planar mode.

FIG. 5 illustrates the prediction fusion by weighted averaging of $M_1$, $M_2$ and a Planar mode. Assuming a square shaped CU 256, the respective pixels of the CU 256 are predicted by the two most represented IPMs $M_1$, $M_2$ taken from the HoG 260, thereby obtaining the predictor blocks $Pred_1$, $Pred_2$ and $Pred_3$. The respective predictor blocks are weighted by weights $w_1$, $w_2$, $w_3$, and are fused or combined into the final predictor block including the DMID predictor for the respective samples or pixels in the CU 256.

Figure 6:
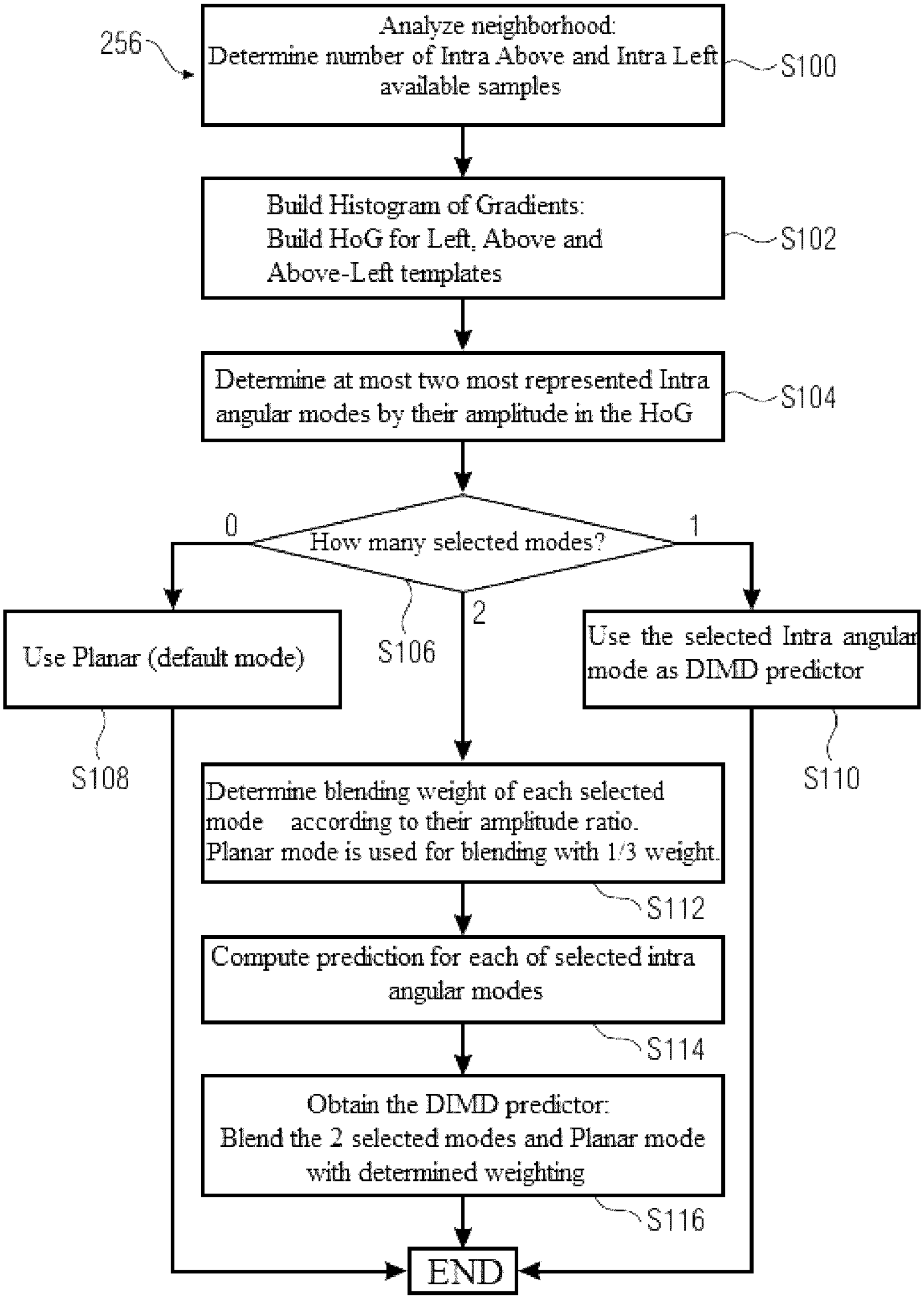
FIG. 6 illustrates an example of a conventional DIMD predictor derivation process.

FIG. 6 illustrates an example of a conventional DIMD predictor derivation process. At S100, using an input CU 256, the neighborhood of the input CU 256 is analyzed so as to determine a number of available intra above and intra left samples. At S102, the HoG 260 is built for the template area 258, i.e., on the basis of the available intra samples angular prediction modes, IPMs, are determined (step S104) by their cumulated amplitude in the HoG 260 (step S104). At S106 it is determined how many IPMs are selected, i.e., whether no IPM has been selected, whether one IPM has been selected or whether two IPMs have been selected. In case no IPM has been selected, only the Planar mode, which may be the default mode, is applied, as is indicated at S108, so as to obtain the DIMD predictor. In case only one IPM is selected, the selected IPM is used to obtain the DIMD predictor, as is indicated at S110. In case two IPMs are selected, at S112 the blending weight for each selected mode is determined according to their cumulated amplitude ratio, and the weight for the Planar mode is set to 1/3. At S114 the predictor blocks $Pred_1$, to $Pred_3$ for each selected IPM and the Planar mode are calculated and at S116 the DIMD predictor is obtained by blending the two selected IPMs and the Planar mode using the determined bending weights.

Figure 7:
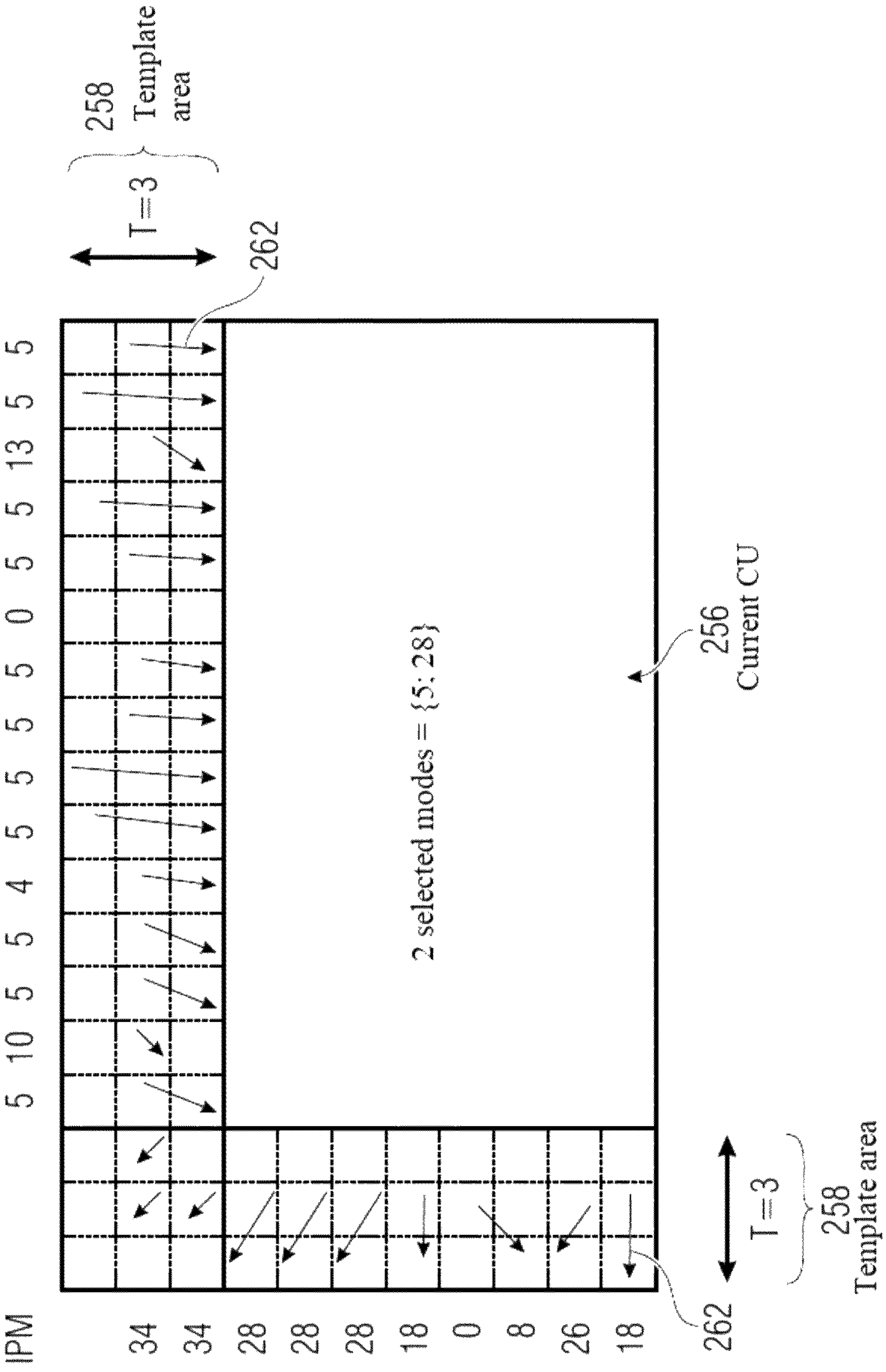
FIG. 7 illustrates an example of a currently processed and an associated template area having a width/height of samples or pixels.

FIG. 7 illustrates an example of a currently processed CU 256 and the associated template area 258 having a width/height of T=3 samples or pixels. For each middle line sample 262 a respective orientation is illustrated by the direction of the respective arrow, and a respective intensity of the gradient is indicated by the length of the arrow. The HoG is generated by cumulating intensities for each orientation/IPM entry, and the two most important modes, in case they exist, in the HoG are selected as modes to be blended with the Planar mode or planar intra prediction mode. In the example of FIG. 7, IPMs 5 and 28 have the first and second highest cumulated intensities/amplitudes. These modes are weighted, as described above, and the blending weights, conventionally, are fixed and/or determined according to the ratio of cumulated intensities/amplitudes of the selected IPMs. Although different blending patterns are proposed in the prior art, all blending patterns are global with regard to the currently processed block or CU. More specifically, when considering conventional approaches and when selecting two IPMs, like $M_1$ and $M_2$, the blending weights may be computed as follows $$w_1 = \frac{43}{64} \times \frac{ampl(M_1)}{ampl(M_1) + ampl(M_2)}$$

$$w_2 = \frac{43}{64} \times \frac{ampl(M_2)}{ampl(M_1) + ampl(M_2)}$$

$$w_3 = \frac{21}{64}$$

with $w_1$ associated with IPM $M_1$, $w_2$ associated with IPM $M_2$, and $w_3$ associated to the Planar mode. Different modifications of the bending process are described, for example, selecting multiple blending modes based on a rate distortion optimization, or deriving implicitly two out of three blending modes using the HoG, or implicitly deriving blending modes using template matching, or different blending modes according to a number of determined DIMD modes. When DIMD is applied, one or two IPMs are derived from the reconstructed neighboring samples, i.e., from the template area, and in case two intra modes are derived, they are combined, i.e., blended, with the Planar mode predictor, conventional solutions always implement a global or CU-level weighted mixing of the two IPMs with Planar mode.

Conventionally, in the reconstructed part 252 of the picture 250 three columns and lines of reconstructed samples or pixels are used for the DIMD process, i.e., filters having fixed filtering windows of 3×3 samples and being located at the same position in the template area 258 are used to compute the HoG 260. A 3×3 Sobel filter 259 may be replaced by 3×2 filter when computing a gradient on a pixel located in the left column, top row or top-left sample and directly neighboring the current CU. Instead of using a 3×3 Sobel filter 259 on all pixels or samples in the middle line of the template area 258, the 3×3 Sobel filter 259 may be applied more sparsely, e.g., only at one middle line sample in the left template area and at one middle line sample in the above template area. Further aspects of the DIMD process are described, e.g., in

- dealing with the blending of the modes,
- dealing with behavior correction (bug fixes) with regards to an original intent,
- dealing with a combination with other modes,
- dealing with syntax or simplifications for the DIMD process.

However, the basic DIMD process described above with reference to FIG. 6.

The conventional blending process for obtaining a final intra predicted block is disadvantageous as it uses weights that apply globally for the entire block or CU, which is currently processed, so that the weights do not account for local characteristics of the IPM, such as an orientation and intensity of the IPMs in the reconstructed template area which results in a less faithful intra predictor. A further disadvantage is that in case only one IPM is selected, the predictor is not combined with a Planar mode or DC mode predictor, i.e., it is the same as in a conventional intra prediction mode. Nevertheless, this mode is coded as a DIMD mode so that when compared to the conventional intra prediction mode, an additional computational overhead is generated as it is required to calculate the HoG which, eventually, may yield only a single IPM to be used.

Thus, there is a need to provide further improvements for the DIMD process.

The present disclosure provides a method of deriving a Decoder-side Intra Mode Derivation, DIMD, predictor for respective samples of a coding unit, CU, of a picture. The method includes:

- selecting one or more Intra Prediction Modes, IPMs, in a template area adjacent to the CU,
- for each sample of the CU, determining, dependent on a distance of the sample of the CU to the template area, blending weights for blending at least the one or more selected IPMs, and
- generating the DIMD predictor by blending the one or more selected IPMs and a Planar or DC mode using the determined blending weights.

In an embodiment, the blending weights are determined such that the samples, like prediction samples, of the CU closer to the template area are weighted with a higher IPM contribution, and the samples of the CU further away from the template area are weighted with higher Planar or DC contribution.

In an embodiment, the blending weights for the selected IPMs for a sample of the CU are determined by weighting a first value obtained from one or more predefined characteristics associated with the IPMs in accordance with the distance.

In an embodiment, the blending weight for a Planar or DC mode is determined using only the distance.

In an embodiment, the distance for a sample is determined using only a position of the sample in the CU and a size of the CU.

In an embodiment, the one or more IPMs are selected using IPM statistics, like a Histogram of Gradients, HoG, determined globally over

- the entire template area, the template area including a plurality of template area regions, wherein the selection is performed globally for the entire CU, or
- the selection involves a global selection of a set of IPMs for the entire CU, followed by a further region-wise selection out of the set of IPMs for each CU region.

In an embodiment, the one or more IPMs are selected using IPM statistics, like a Histogram of Gradients, HoG, determined separately over each of a plurality of template area regions of the template area, the plurality of template area regions including a left template area region and an above template area region, wherein the selection involves a region-wise selection out of the separately determined IPMs for each CU region.

In an embodiment, in case a selected IPM is present only in one of the template area regions, the blending weight of the selected IPM is determined dependent on the distance of a sample in the CU to the adjacent template area region in which the selected IPM is present.

In an embodiment, the distance for a sample is determined using only one of the position coordinates of the sample in the CU and only one dimension of the CU.

In an embodiment, the method further includes:

- splitting the CU into two or more CU regions,
- wherein for at least one of the CU regions adjacent to the template area, for each sample of the CU region the blending weights for blending at least the one or more selected IPMs are determined dependent on a distance of the sample of the CU region to the template area, and
- wherein the DIMD predictor is generated using the blending weights determined for each CU region.

In an embodiment, only for one or some but not all of the CU regions of the CU the blending weights are determined dependent on a distance of the samples of the respective CU region to the template area, and for each remaining CU region the blending weights for blending at least the one or more selected IPMs are

- global blending weights determined for the entire CU, or local blending weights determined dependent on an adjacency of the CU region to the template area.

In an embodiment, for a CU region located not adjacent to the template area, only the Planar mode is selected as the DIMD predictor, or only the DC mode is selected as the DIMD predictor, or the blending weights are determined using the one or more selected IPMs in one or more or all template area regions, or the blending weights are determined by weighting blending weights of a CU region adjacent to a template area region.

The technical solutions provided according to embodiments of the present disclosure have the following beneficial effects.

In prior art approaches, the blending weights are computed for the entire CU currently processed or predicted, i.e., conventional approaches focus on a global or CU level approach when determining the blending weights for the selected IPMs. However, the signal characteristics of the IPMs may differ across the template area so that the selected weights may be more suitable for obtaining the DIMD predictor for samples in one CU region than for obtaining the DIMD predictor for samples in another CU region. In other words, the weights may not account for local characteristics of the IPMs, such as an orientation and intensity of the IPMs in the reconstructed template area, which results in a less faithful intra predictor.

The present disclosure addresses the disadvantages found in prior art approaches by modifying the conventional DIMD blending weighting process by considering a distance of each sample within a currently processed coding unit, CU, to a template area. In other words, a DMID position dependent blending is suggested, which is also referred to in the following as sample-wise adaptive blending, sample-wise blending or sample-wise weighting. For example, a (bi)linear sample-wise weighting is proposed where contributions of two IPMs and a contribution of the Planar/DC mode are balanced so that prediction samples relative to the current CU closer to the template area are weighted with higher IPM contributions and samples closer to the bottom right of the current CU are weighted with a higher Planar/DC contribution. Thereby, during the blending process an intra predictor is created fitting more faithfully to the local orientations of the CU to be predicted, thereby improving the prediction accuracy.

A further disadvantage of conventional approaches is that in case only one IPM is selected, the predictor is not combined with a Planar mode or DC mode predictor, i.e., it is the same as in a conventional intra prediction mode. Nevertheless, this mode is coded as a DIMD mode so that when compared to the conventional intra prediction mode, an additional computational overhead is generated as it is required to calculate the HoG which, eventually, may yield only a single IPM to be used. The present disclosure is advantageous because, in accordance with embodiments, the sample-wise blending weights are also used when deriving only one IPM by combining the only one IPM and the Planar or DC mode using the sample-wise blending weight determined for the one selected IPM thereby also taking advantage of the DIMD mode for such a scenario.

Figure 8:
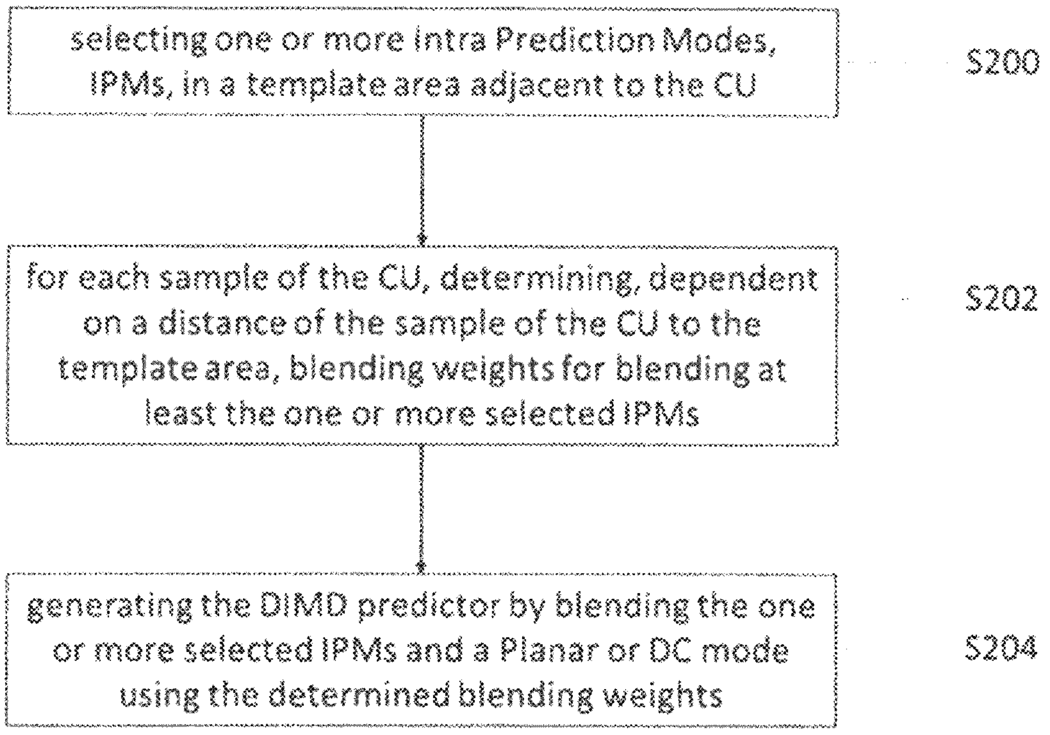
FIG. 8 illustrates a flow diagram of a method of deriving DIMD predictor for respective samples of a CU of a picture in accordance with embodiments of the present disclosure.

FIG. 8 illustrates a flow diagram of a method in accordance with embodiments of the present disclosure for deriving decoder-side intra mode derivation predictor for respective samples of a coding unit of a picture, and the method includes the following steps:

S200: Selecting one or more Intra Prediction Modes, IPMs, in a template area adjacent to the CU.

S202: For each sample of the CU, determining, dependent on a distance of the sample of the CU to the template area, blending weights for blending at least the one or more selected IPMs.

S204: Generating the DIMD predictor by blending the one or more selected IPMs and a Planar or DC mode using the determined blending weights.

In other words, embodiments provide a method for deriving DIMD predictor for samples of a CU on the basis of blending weights for blending IPM(s)/Planar or DC mode with a blending weight determined for each sample dependent on a distance between the sample and the template area, instead of using the same blending weight for each sample in the CU.

Figure 9:
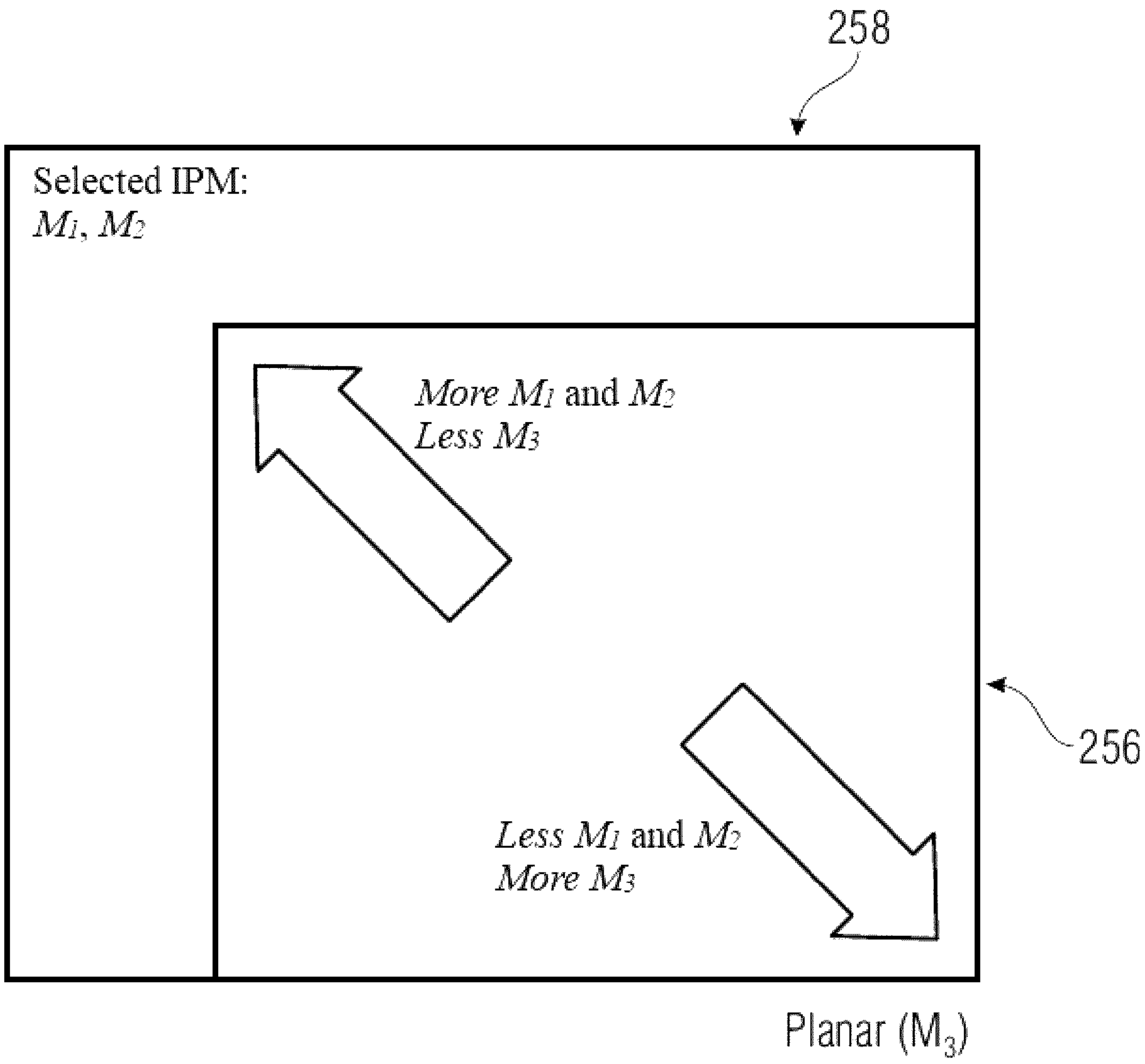
FIG. 9 illustrates a sample-wise blending weighting according to a distance of current CU samples to a template area in accordance with embodiments of the present disclosure.

In accordance with embodiments, a linear or bilinear sample-wise weighting is used in accordance with which contributions of a first intra prediction mode $M_1$ and of a second intra prediction mode $M_2$ as well as the contribution of a Planar or DC intra prediction mode $M_3$ are balanced so that the prediction samples relative to the currently processed CU, which are closer to the template area, are weighted with higher $M_1$ and $M_2$ contributions than samples closer to the bottom right corner of the currently processed CU which are weighted with a higher Planar/DC contribution. FIG. 9 illustrates a sample-wise blending weighting according to a distance of current CU samples to a template area in accordance with embodiments of the present disclosure. FIG. 9 illustrates the CU 256 and the template area 258. It is assumed that from a HoG generated for the entire template area 258 a first IPM $M_1$ and a second IPM $M_2$ are selected, for example IPMs for which the accumulated amplitude in the HoG exceeds a predefined value, like 50, or for which the number of sample positions at which the respective IPM is determined exceeds a certain threshold. As is schematically indicated in FIG. 9, prediction samples for the CU 256 which are closer to the template 258 experience more $M_1$ and $M_2$ contributions and less $M_3$ contributions associated with a Planar/DC mode, while the predictive samples closer towards the lower right bottom of the CU 256 experience less $M_1$ and $M_2$ contributions but more $M_3$ contributions.

In accordance with embodiments of the present disclosure, the above described conventional DIMD predictor derivation process (see FIG. 6) is modified with regard to the DIMD predictor computation by blending the selected IPMs and a Planar/DC mode.

It is noted that the present disclosure is not limited to determining the IPM statistics, on the basis of which the one or more IPMs are selected, on the basis of a HoG. In accordance with other embodiments, other approaches may be applied for determining the IPM statistics, e.g., a Hough transform or a gradient-based Hough transform may be used on a filtering window size in order to determine directions for each center pixel (of the filtering window) and then a histogram of found directions may allow selecting the peak direction (and the matching IPM).

1st Aspect: Sample-Wise Blending Weights

Figure 10:
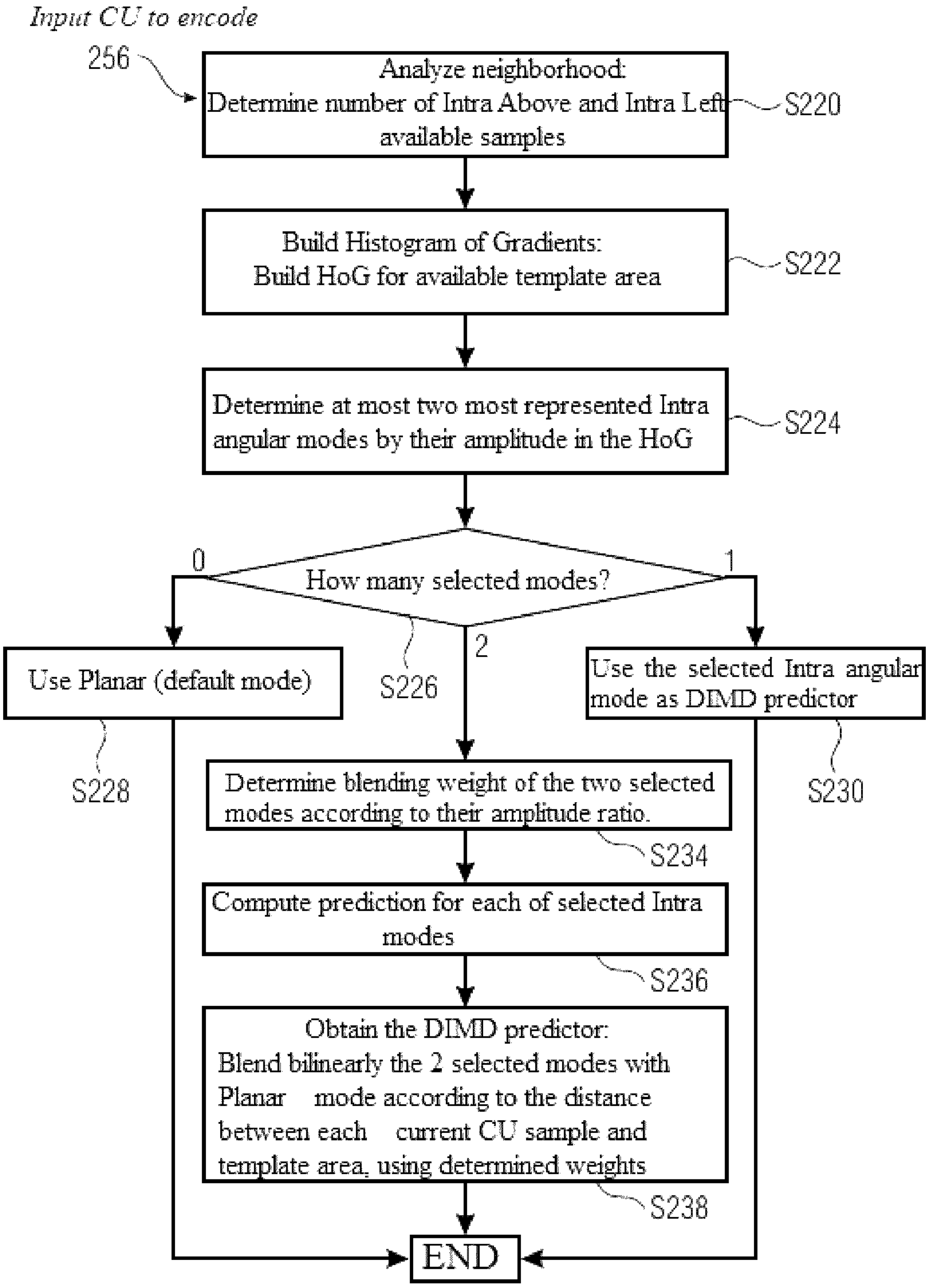
FIG. 10 illustrates a flow diagram illustrating the DIMD predictor derivation process in accordance with embodiments of a first aspect of the present disclosure.

FIG. 10 illustrates a flow diagram illustrating the DIMD predictor derivation process in accordance with embodiments of a first aspect of the present disclosure. At S220 the neighborhood of the currently processed CU 256 is analyzed so as to determine a number of available intra above and intra left samples. At S222, a histogram of gradients, HoG, is built for the entire template area 258, i.e., by filtering the samples in the template area in a way as described above with reference to FIG. 4. At S224, one or more intra angular modes, IPMs, are determined. In the depicted embodiment, at most two of the most represented intra angular modes are selected from the HoG. As mentioned above, the HoG indicates for each IPM the amplitudes accumulated over all occurrences of the respective IPM in the template area and, in accordance with embodiments, the IPM having the highest accumulated amplitude and the IPM having the second highest accumulated amplitude may be selected at S224. At S226 it is determined how many IPMs are actually selected and in case none or zero IPMs are selected, the Planar or DC mode, which may be the default mode, is used as the DIMD predictor, as is indicated at S228. In case only one IPM is selected, this selected IPM is used as the DIMD predictor, as is indicated at S230. In case two IPMs are selected, at S232 the blending weight of the two selected modes is determined according to the cumulated amplitude ratio, and at S234 for each selected IPM the prediction is determined or computed. At S236 the DIMD predictor is obtained by linearly blending the two selected modes with the Planar or DC modes according to the distance between each sample in the currently processed CU 256 and the template area 258 using the determined weights.

Thus, in the above described embodiment, the selection of the IPMs is not modified, i.e., may be as suggested in conventional, prior art approaches, however, the blending weights for the selected IPMs for a sample of the CU are determined by weighting a first value, like the weight obtained from one or more predefined characteristics associated with the IPMs, like a the cumulated amplitudes from a HoG, in accordance with the distance. The blending weight for a Planar or DC mode may be determined using only the distance.

Further embodiments for determining or setting the blending weights are now described in more detail, without limiting the present disclosure to these embodiments. When considering, in accordance with embodiments, that at most two IPMs are selected, initially the blending weights $w_1$, $w_2$, $w_3$ may be computed by a conventional process, like the one described above with reference to FIG. 6. For obtaining the DIMD predictor, the blending weights of the first and second selected IPMs, namely $w_1$ for IPM1, $w_2$ for IPM2 and $w_3$ for the Planar/DC mode, are modified such that the respective weights, by which the ratio of the accumulated amplitudes of the IPMs are weighted, are further weighted using the distance between the sample in CU and the template area.

In other words, conventionally, for each sample at a position (x, y) in the current CU 256, the weighting is performed as follows:

$$w_1 = \frac{2}{3} \times \frac{ampl(M_1)}{ampl(M_1) + ampl(M_2)}$$

$$w_2 = \frac{2}{3} \times \frac{ampl(M_2)}{ampl(M_1) + ampl(M_2)}$$

$$w_3 = \frac{1}{3}$$

The resulting prediction may be generically written as:

$$P(x, y) = \sum_i M_i(x, y) \times w_i$$

with i the index of weight, P(x,y) the resulting prediction sample, $M_i$(x, y) the i-th IPM sample, S(x,y) the sample of the current CU, and $w_i$ the weight associated to the i-th selected IPM. It is noted that the weights sum is equal to 1:

$$\sum_i w_i = 1$$

and:

$$\sum_i \frac{ampl(M_1)}{\sum_j ampl(M_j)} = 1$$

with i and j between 1 and N (N being the number of selected IPMs in the HoG).

Assuming d the distance between a sample at position (x,y) in the current CU and a sample T (or a set of samples $T_i$) located in the template area with d=0 for samples adjacent to the template area and d=1 for the sample in the bottom right corner of the current CU.

$$d = \text{distance}(S;\ T)$$

Consequently, samples of the current CU located on the top and left edges of the current CU may be blended with the following weights (d=0):

$$w_{1,edge} = \frac{ampl(M_1)}{ampl(M_1) + ampl(M_2)}$$

$$w_{2,edge} = \frac{ampl(M_2)}{ampl(M_1) + ampl(M_2)}$$

$$w_{3,edge} = 0$$

and the sample of the current CU located in the bottom right corner of the current CU is blended with the following weights (d=1):

$$w_{1,BR} = 0$$

$$w_{2,BR} = 0$$

$$w_{3,BR} = 1$$

Figure 11:
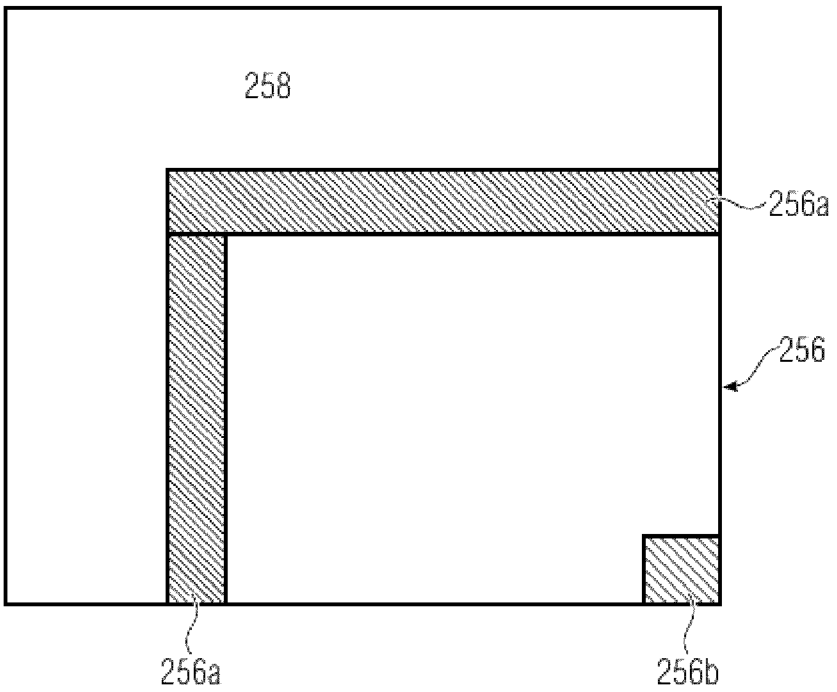
FIG. 11 illustrates positions of relevant template/CU areas and samples in accordance with embodiments of the present disclosure.

FIG. 11 illustrates the positions of the relevant areas and samples in accordance with embodiments of the present disclosure. A currently processed CU 256 and the adjacent template area 258 is illustrated, and the coordinate x extends in the horizontal direction and the coordinate y extends in the vertical direction. The position (0,0) is at the top-left corner of the CU 256 and the position (1,1) is at the bottom right corner of the CU 256. The edge samples 256*a* which are located on the top and left edges of the CU 256 are weighted as described above, and likewise the bottom-right sample 256*b* is weighted as described above. All samples within the remaining area 256*c* of the CU 256 are blended using weights being modified dependent on the distance of the respective sample in the region 258*c* to the template area 258. In the above described embodiment, the normalized distance was assumed to be d=0 at the top-left sample of the CU 256 and d=1 at the bottom-right sample. In accordance with other embodiments, the normalized distance may be selected to be 0 for the bottom-right sample and d=1 for the edge samples 256*a*.

Several mathematical formulations of distances may be selected according to the positioning of the samples T or $T_i$. In the following, two embodiments are provided for determining the distances of the respective samples, however, the present disclosure is not limited by such embodiments, rather any other suitable mathematical approach for determining a distance between two samples may be applied. Preferably, the distances, as mentioned above, are normalized to be straightforwardly used in the blending weights equations with minimum edits with regard to the existing formulations.

In accordance with embodiments, the distance for a sample is determined using only a position of the sample in the CU and a size of the CU.

Further embodiments for determining or setting the blending weights according to the distance are now described in more detail, without limiting the present disclosure to these embodiments. In accordance with an embodiment, an increasing distance is considered from the template area 158 towards the bottom-right corner sample, and the distance may be determined as follows:

$$d_1(x, y) = \frac{\min(x, y)}{\min(W, H) - 1}$$

where (x,y) is the position of the sample S in the current CU with (0,0) being the top left sample position, W is the width and H the height of the current CU 256 as indicated in FIG. 11. FIG. 11 further includes the arrow d1 indicating the increasing distance from the top-left sample towards the bottom-right sample.

In accordance with another embodiment, the distance may be considered from the top-left sample position, the (0, 0) location in the currently processed CU 256, and the distance may be expressed as follows:

$$d_2(x, y) = \frac{x + y}{W + H - 2}$$

It is noted that the distance d only depends on the position of the considered sample in the current CU 256 and the size of the current CU 256.

Figure 12:
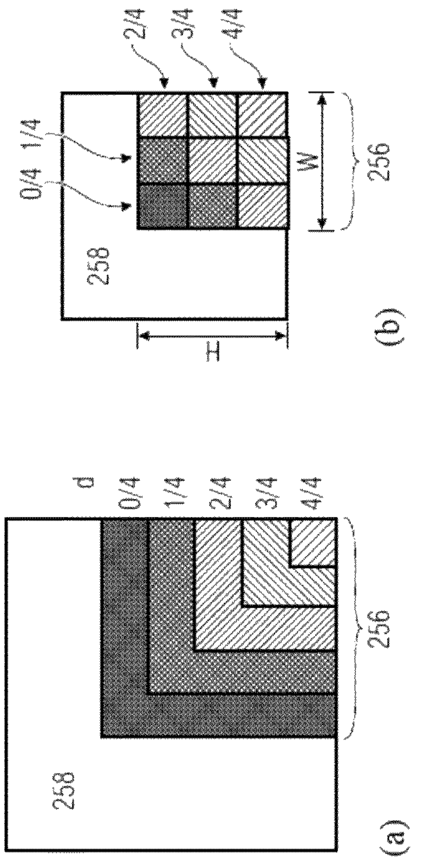
FIG. 12 illustrates the distances between a sample in a current CU and one or more samples in the template area for a square-shaped CU.

FIG. 12 illustrates the distances $d_1$ and $d_2$ between a sample in the current CU 256 and the one or more samples in the template area 258 for a square-shaped CU 256. FIG. 12(*a*) indicates the normalized distances d in accordance with the above described first embodiment, and FIG. 12(*b*) indicates the normalized distances d in accordance with the above described second embodiment.

Figure 13:
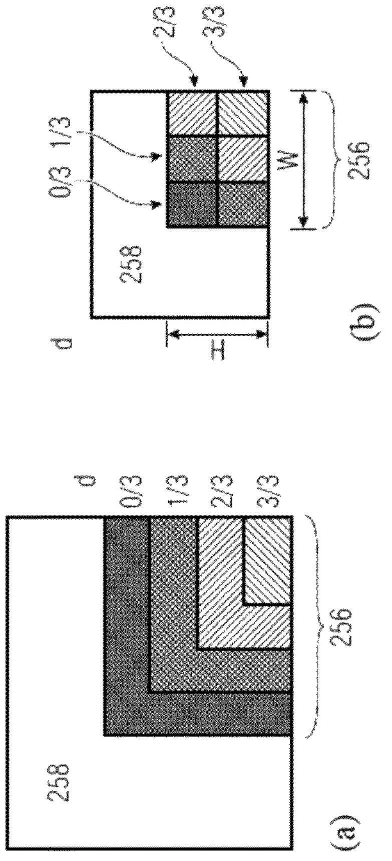
FIG. 13 illustrates the distances between a sample in a current CU and one or more samples in the template area for a rectangular-shaped CU.

FIG. 13 illustrates the respective distances in a similar way as in FIG. 12, however for a rectangular shaped CU 256. Again, FIG. 13(*a*) illustrates the normalized distances in accordance with the above described first embodiment, and FIG. 13(*b*) illustrates the normalized distances in accordance with the above described second embodiment.

In accordance with embodiments of the present disclosure, the modified weight computation may be as follows (with floating point precision):

The proposed modified weight computation is as follows (with floating point precision):

$$w_1(x, y) = (1 - d(x, y)) \times \frac{ampl(M_1)}{ampl(M_1) + ampl(M_2)}$$

-continued $$w_2(x, y) = (1 - d(x, y)) \times \frac{ampl(M_2)}{ampl(M_1) + ampl(M_2)}$$

$$w_3(x, y) = d(x, y)$$

where $w_1(x, y)$, $w_2(x, y)$ and $w_3(x, y)$ denote the weights associated to a sample S(x,y) at position (x,y) in the current CU at a distance d. $w_2(x, y)$ and $w_3(x, y)$ may also be written as follows:

$$w_2(x, y) = (1 - d(x, y)) - w_1(x, y)$$

and $$w_3(x, y) = 1 - (w_1(x, y) + w_2(x, y))$$

The above formulae may be generalized as follows as a function of the number N of IPMs selected in the template area region and further considering a N+1$^{th}$ mode as Planar or DC mode:

$$w_i(x, y) = (1 - d(x, y)) \times \frac{ampl(M_i)}{\sum_{j=1}^{N} ampl(M_j)}$$

$$w_{N+1}(x, y) = d(x, y)$$

It is noted that:

$$\sum_{i=1}^{N} w_i(x, y) = 1 - d(x, y)$$

In the above described embodiments, the weighting coefficients may be expressed with a floating point arithmetic, however, in accordance with other embodiments, the weighting coefficients may also be expressed in accordance with any other precision and, in particular, with an integer precision, like a 6-bit precision which may be advantageous in case the IPM amplitude ratio is also implemented as an integer arithmetic. In accordance with further embodiments, the weights are expressed as a power of 2 so that the blending process average is computed as a right shift, rather than using a division.

The above described embodiments applied the inventive approach when using or selecting at least two IPMs from the HoG process. However, the present disclosure is not limited to such embodiments, rather, it may also be applied in case no, one or more than two IPMs are selected from the HoG process. In case no IPM is selected, this means that the Planar or DC mode is selected. In case only one IPM is selected in the template area 258, this IPM may be blended with the Planar or DC mode so that the distance of the prediction samples in the CU 256 to the template area 258 is taken into account, for example as follows:

$$w_1(x, y) = 1 - d(x, y)$$

$$w_3(x, y) = d(x, y)$$

As mentioned above, in accordance with other embodiments, the distance d may be set to 0 at the bottom-right corner sample 256*b* and may be set to 1 for the samples 256*a* adjacent to the template area 258. In accordance with such embodiments, when assuming that two IPMs are selected from the HoG and are blended with the Planar/DC mode, the weighting formulas may be expressed as follows:

$$w_1(x, y) = d(x, y)) \times \frac{ampl(M_1)}{ampl(M_1) + ampl(M_2)}$$
$$w_2(x, y) = d(x, y)) \times \frac{ampl(M_2)}{ampl(M_1) + ampl(M_2)}$$
$$w_3(x, y) = 1 - d(x, y)$$

The remaining process may be unmodified and the positional computed weights are used during the blending process. For each sample at position (x,y) in the current CU the prediction may be determined as follows:

$$P(x, y) = \sum_i M_i(x, y) \times w_i(x, y)$$

with i the index of the weight, P(x,y) the resulting prediction sample, $M_i$(x, y) the i-th IPM sample, S(x, y) the sample of the current CU, $w_i$(x, y) the weight associated with the i-th selected IPM (with possibly 2 selected angular IPM and the 3rd one being Planar or DC mode).

In accordance with embodiments, implementing or enabling the blending process may depend on the size of the CU 256. The blending process may be constrained to not be operated below a certain CU size, for example for CUs having a size of 4×4 or less and/or to CUs exceeding a certain size, for example having a size of 16×16 samples or more.

2nd Aspect: Sample-Wise Blending Weights with Localized IPM

In accordance with a second aspect of the present disclosure, the inventive approach described above with reference to the first aspect is combined with an approach in accordance with which the one or more IPMs to be used for the blending process are selected per template area region, i.e., the one or more IPMs are determined not for the entire template area 258 but for different template area regions individually. This approach, also referred to as DIMD IPM selection per template area region, is described in the co-pending patent application having the title "METHOD AND APPARATUS FOR DIMD INTRA PREDICTION MODE SELECTION IN A TEMPLATE AREA, AND ENCODER/DECODER INCLUDING THE SAME" which has been filed by the applicant on the same day as the present application and the contents of which is incorporated herewith by reference.

Figure 14:
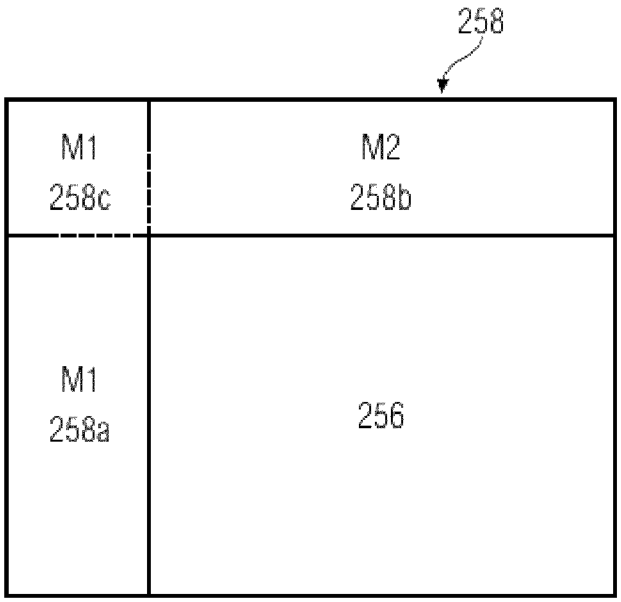
FIG. 14 illustrates an IPM selection per template area region.

FIG. 14 illustrates the IPM selection per template area region. The template area 258 to which the CU 256 is adjacent is split into the left template area region 258*a*, the above template area region 258*b* and the above-left template area region 258*c*. For each of the template area regions 258*a* to 258*c* an HoG is computed, and the above mentioned one or more IPMs are selected from the peaks in the HoG of the respective template area regions, i.e., each template area region is associated with a number of IPMs. FIG. 14 illustrates an embodiment in accordance with which in each of the template area regions an IPM has been selected from the respective template area HoG, namely a first IPM $M_1$ has been selected for the left template area region 258*a* and for the above-left template area region 258*c*, while a second IPM $M_2$ has been selected for the above template area region 258*b*. Like in the first aspect, each weight $w_i$ is associated with the IPM $M_i$, however, in accordance with the second aspect, the distance function $d_i$ depends on the distance of the samples in the CU 256 to those template regions in which the IPM $M_i$ is present. In accordance with embodiments, only the left and above template area regions 258*a* and 258*b* for which an IPM is selected are considered, i.e., IPMs selected from the above-left template region 258*c* may be disregarded. The above described weighting formula are not changed, however, the distance computation is changed and depends on the presence or not of each selected IPM in the template area regions.

In accordance with embodiments the distance for a sample is determined using only one of the position coordinates of the sample in the CU and only one dimension of the CU.

Figure 15:
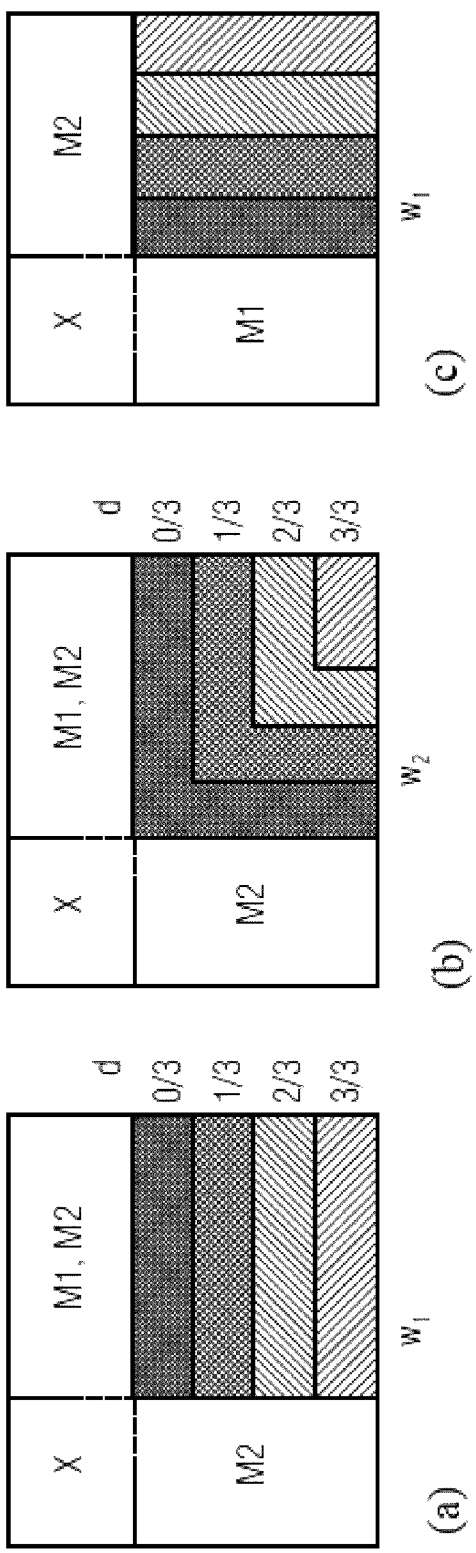
FIG. 15 illustrates an embodiment of a second aspect of the present disclosure where a distance used in the weighting function is dependent on the presence of an IPM in each template area region.

Further embodiments for determining or setting the blending weights according to a distance determined using only one of the position coordinates of the sample in the CU and only one dimension of the CU are now described in more detail, without limiting the present disclosure to these embodiments. FIG. 15 illustrates an embodiment of the second aspect of the present disclosure in accordance with which a distance used in the weighting function is dependent on the presence of an IPM $M_i$ in each template area region. In FIG. 15(*a*) and FIG. 15(*b*) the first IPM $M_1$ is assumed to be present only in the above template area region 258*b*, while the second IPM $M_2$ is present in both the left template area region 258*a* and the above template area region 258*b*, whereas in FIG. 15(*c*) the first IPM $M_1$ is present only in the left template area region 258*a* and the second IPM $M_2$ is present only in the above template area region 258*b*.

In the examples of FIG. 15(*a*) and FIG. 15(*b*), the distance computation for $w_2$ is the same as described above with reference to the first aspect because IPM $M_2$ is present in the two template area regions, however, the distances used for computing the weight $w_2$ associated with IPM $M_2$ may be $d_1$ or $d_2$ as described above with reference to the first aspect, and FIG. 15(*b*) illustrates the normalized distances $d_1$ also described above with reference to FIG. 13(*a*). On the other hand, since IPM $M_1$ is present only on the above template area region 258*v*, the distance $d_1$ for computing $w_1$ is modified as follows:

$$d_{1,M_1}(x, y) = \frac{x}{H - 1}$$
$$w_i(x, y) = \left(1 - d_{M_i}(x, y)\right) \times \frac{ampl(M_i)}{\sum_{j=1}^{N} ampl(M_j)}$$

On the other hand, in case IPM $M_1$ is present only on the left template area region, the distance $d_1$ used for computing $w_1$ is modified as follows:

$$d_{1,M_1}(x, y) = \frac{x}{W - 1}$$

More generally, the weight $w_i$ for an IPM $M_i$ that is present on only one of the above and left template area regions may be written as follows:

$$w_i(x, y) = \left(1 - d_{M_i}(x, y)\right) \times \frac{ampl(M_i)}{\sum_{j=1}^{N} ampl(M_j)}$$

3rd Aspect: Combined Sample-Wise with Region-Wise Blending Weight Operations

In accordance with a third aspect, the inventive approach may be applied when the blending weights are computed region-wise based on an adjacency of CU regions to respective template areas.

Figure 16:
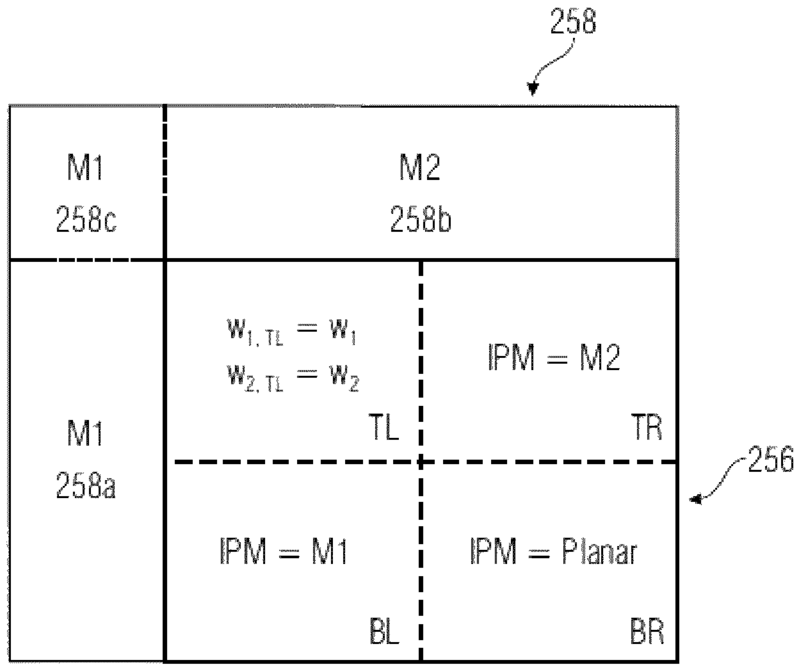
FIG. 16 illustrates an embodiment in accordance with which a CU is split into four CU regions.

FIG. 16 illustrates an embodiment in accordance with which the CU 256 is split into four CU regions, namely the top-left region, TL, the top-right region TR, the bottom-left region, BL, and the bottom-right region, BR. The template area 258 includes the left template area region 258*a*, the above template area region 258*b* and the above-left template area region 258*c*. In accordance with embodiments of the third aspect, the one or more IPMs are obtained from an HoG generated for the entire template area 258, and for each of the CU regions, TL, TR, BL and BR, the respective blending weights $w_1$, $w_2$, $w_3$ are calculated dependent on the adjacency of the respective region to one of the template area regions 258 to 258*c*. The DIMD region-wise adaptive planning as described in more detail in the co-pending patent application titled "METHOD AND APPARATUS FOR DIMD REGION-WISE ADAPTIVE BLENDING, AND ENCODER/DECODER INCLUDING THE SAME" of the applicant and the contents thereof is incorporated herewith by reference. In the example depicted in FIG. 16, the top-left CU region TL is adjacent to all template area regions, and when assuming two IPMs $M_1$, $M_2$ being selected, for the top-left CU region TL the weights $w_1$, $w_2$ are used, whereas the top-right and bottom-left CU regions TR, BL which are adjacent only to the left template area region 258*a* and the above template area region 258*b*, respectively, select IPM $M_1$ and IPM $M_2$, respectively, as the DIMD predictor for the samples in the respective region. For the bottom-right region BR, which is not adjacent to any of the template area regions, the Planar or DC mode is provided as the DIMD predictor for the samples in this region.

In accordance with embodiments of the third aspect of the present disclosure, within each CU region, the respective weights are adjusted and computed as described above in accordance with the first and second aspects of the present disclosure so that, for example, in the top-left CU region TL where weights $w_1$, $w_2$ may be modified dependent on the distance of the samples within the respective CU region from a template area region adjacent to the CU region. For example, for the top-left region TL the distance may be calculated in accordance with the embodiments of the first aspect (see e.g., FIG. 12 or FIG. 13), while for the top-right and bottom left regions TR, BL the distance may be calculated in accordance with the embodiments of the second aspect (see e.g. FIG. 15).

In accordance with other embodiments, only the top left CU region TL of the CU 256 applies the sample-wise weighting as described in the preceding embodiments, while the other CU regions only apply the region-wise weighting, and in accordance with such embodiments, the top-left CU region may implement a weight $w_3$ associated with the Planar or DC mode.

In accordance with further embodiments, for continuity rationales, the last weight (which does not depend on the presence of an IPM selected in the template region) relates to the adjacent IPM associated with a template area region. For instance, in the FIG. 16, the current BR region may have a weight $w_3$ allocated to either M2 (top right region of current CU) or possibly, in another embodiment to M1 (bottom left region of current CU).

Further Embodiments

So far, the inventive concept has been described with reference to aspects and embodiments concerning methods for determining a DIMD predictor. In accordance with further embodiments, the present disclosure also provides an apparatus of deriving DIMD predictor as well as encoders/decoders including such an apparatus.

Figure 17:
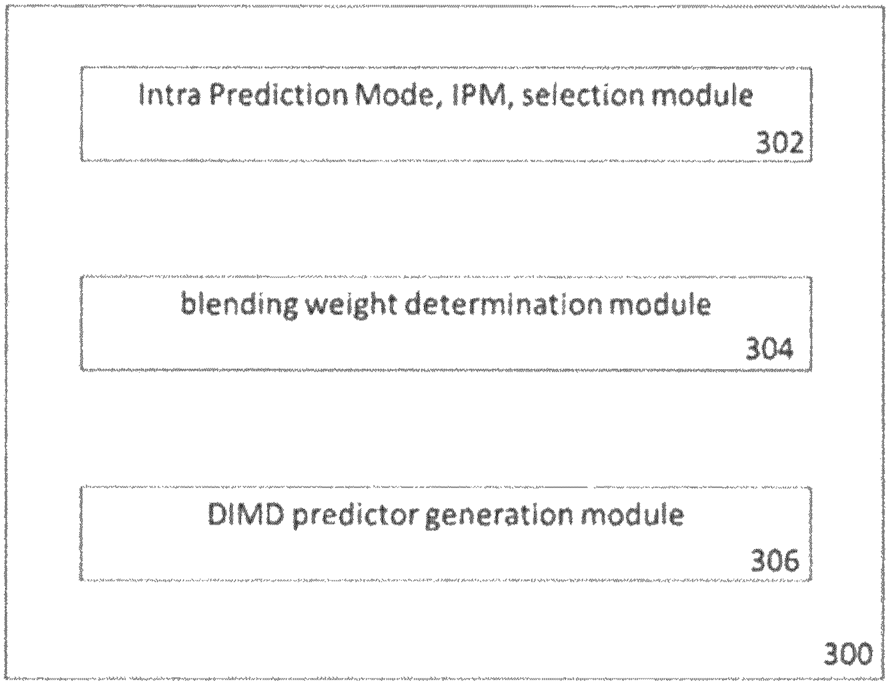
FIG. 17 illustrates a block diagram of an apparatus of deriving DIMD predictor in accordance with embodiments of the present disclosure.

FIG. 17 illustrates a block diagram of an apparatus for deriving a Decoder-side Intra Mode Derivation, DIMD, predictor for respective samples a coding unit, CU, of a picture. The apparatus 300 includes the following modules:

- 302: An Intra Prediction Mode, IPM, selection module configured to select one or more IPMs in a template area adjacent to the CU.
- 304: A blending weight determination module configured to determine, for each sample of the CU, dependent on a distance of the sample of the CU to the template area, blending weights for blending at least the one or more selected IPMs.
- 306: A DIMD predictor generation module configured to generate the DIMD predictor by blending the one or more selected IPMs and a Planar or DC mode using the determined blending weights provided by the blending weight determination module.

Figure 18:
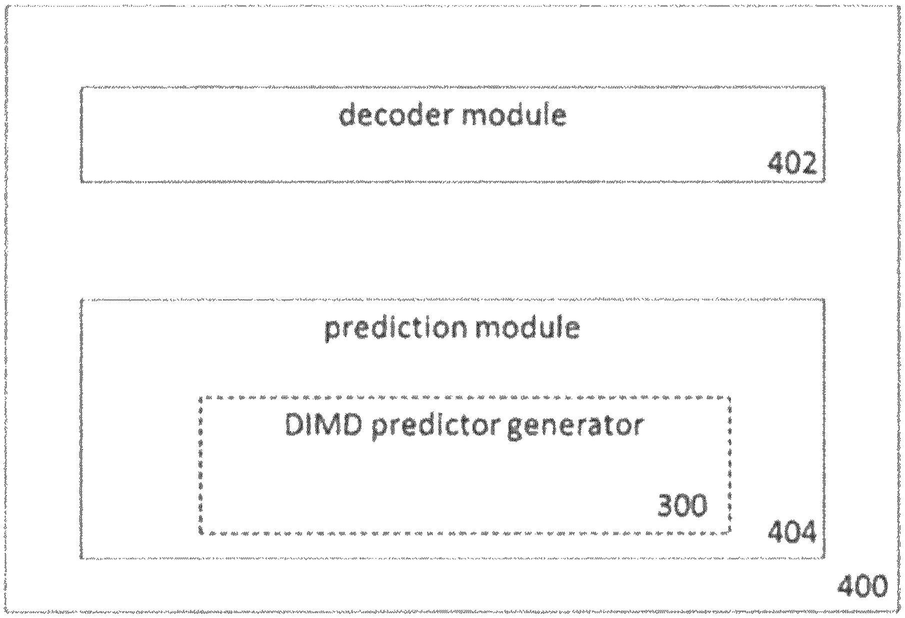
FIG. 18 illustrates a block diagram of a decoder in accordance with embodiments of the present disclosure.

FIG. 18 illustrates a block diagram of a decoder for decoding an encoded data stream, the encoded data stream including data representing a picture in accordance with embodiments of the present disclosure. The decoder 400 includes the following modules:

- 402: a decoder module configured to decode from the encoded data stream the picture.
- 404: a prediction module including an apparatus for deriving a Decoder-side Intra Mode Derivation 300, DIMD, predictor for respective samples of a coding unit, CU, of the picture in accordance with embodiments of the present disclosure.

Figure 19:
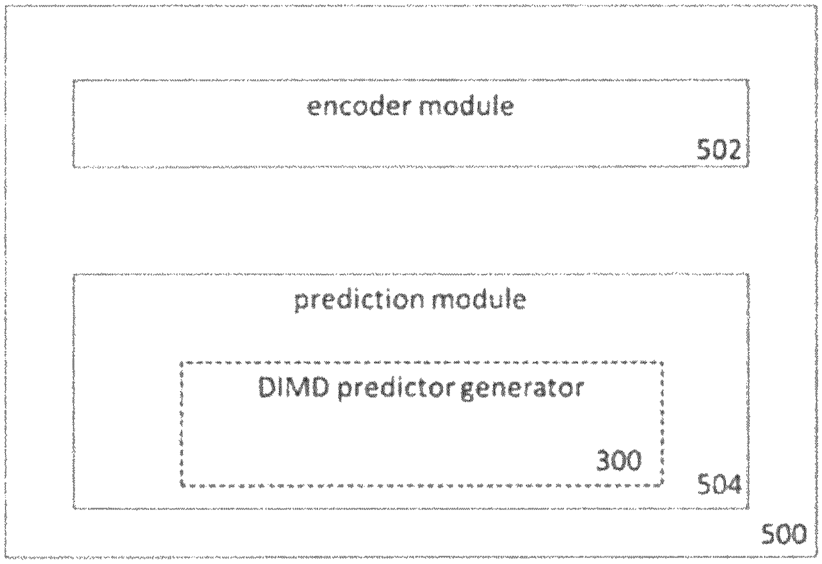
FIG. 19 illustrates a block diagram of an encoder in accordance with embodiments of the present disclosure.

FIG. 19 illustrates a block diagram of an encoder for encoding a picture into an encoded data stream, the encoded data stream including data representing the picture in accordance with embodiments of the present disclosure. The encoder 500 includes the following modules:

- 502: an encoder module configured to receive the original picture and to encode the picture into the encoded data stream.
- 504: a prediction module, the prediction module including an apparatus for deriving a Decoder-side Intra Mode Derivation 300, DIMD, predictor for respective samples of a coding unit, CU, in accordance with embodiments of the present disclosure.

Although some aspects of the disclosed concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 20:
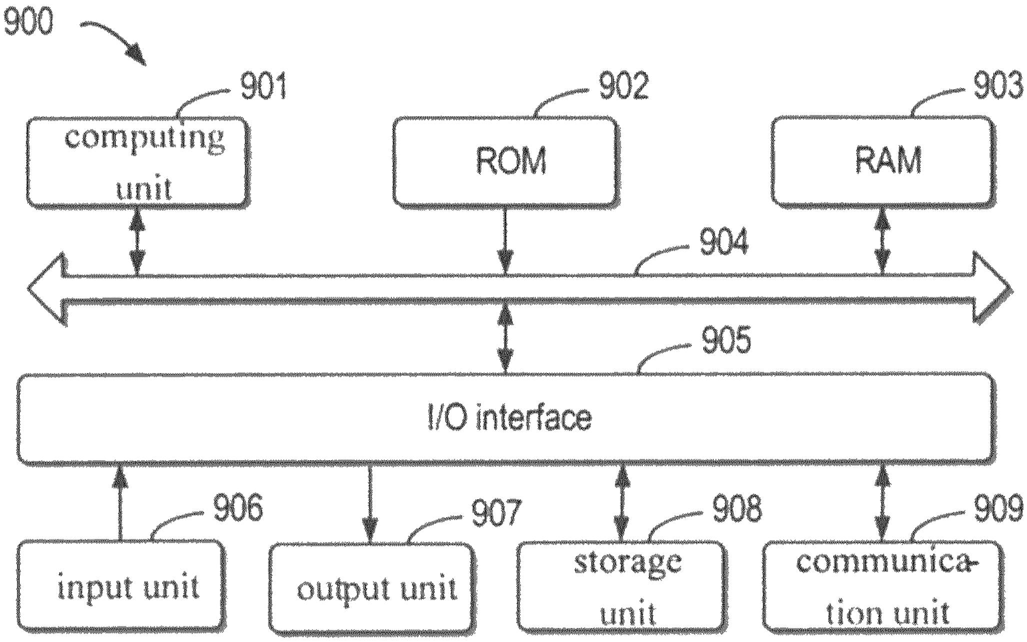
FIG. 20 illustrates a block diagram illustrating an electronic device according to embodiments of the present disclosure.

FIG. 20 is a block diagram illustrating an electronic device 900 according to embodiments of the present disclosure. The electronic device is intended to represent various forms of digital computers, such as a laptop, a desktop, a workstation, a personal digital assistant, a server, a blade server, a mainframe computer, and other suitable computers. The electronic device may also represent various forms of mobile devices, such as a personal digital processor, a cellular phone, a smart phone, a wearable device, and other similar computing devices. The components shown herein, their connections and relationships, and their functions are described as examples only, and are not intended to limit implementations of the present disclosure described and/or claimed herein. The device 900 includes a computing unit 901 to perform various appropriate actions and processes according to computer program instructions stored in a read only memory (ROM) 902, or loaded from a storage unit 908 into a random access memory (RAM) 903. In the RAM 903, various programs and data for the operation of the storage device 900 can also be stored. The computing unit 901, the ROM 902, and the RAM 903 are connected to each other through a bus 904. An input/output (I/O) interface 905 is also connected to the bus 904.

Components in the device 900 are connected to the I/O interface 905, including: an input unit 906, such as a keyboard, a mouse; an output unit 907, such as various types of displays, speakers; a storage unit 908, such as a disk, an optical disk; and a communication unit 909, such as network cards, modems, wireless communication transceivers, and the like. The communication unit 909 allows the device 900 to exchange information/data with other devices through a computer network such as the Internet and/or various telecommunication networks. The computing unit 901 may be formed of various general-purpose and/or special-purpose processing components with processing and computing capabilities. Some examples of the computing unit 901 include, but are not limited to, a central processing unit (CPU), graphics processing unit (GPU), various specialized artificial intelligence (AI) computing chips, various computing units that run machine learning model algorithms, digital signal processor (DSP), and any suitable processor, controller, microcontroller, etc. The computing unit 901 performs various methods and processes described above, such as an image processing method. For example, in some embodiments, the image processing method may be implemented as computer software programs that are tangibly embodied on a machine-readable medium, such as the storage unit 908. In some embodiments, part or all of the computer program may be loaded and/or installed on the device 900 via the ROM 902 and/or the communication unit 909. When a computer program is loaded into the RAM 903 and executed by the computing unit 901, one or more steps of the image processing method described above may be performed. In some embodiments, the computing unit 901 may be configured to perform the image processing method in any other suitable manner (e.g., by means of firmware).

Various implementations of the systems and techniques described herein above may be implemented in digital electronic circuitry, integrated circuit systems, field programmable gate arrays (FPGA), application specific integrated circuits (ASIC), application specific standard products (ASSP), system-on-chip (SOC), complex programmable logic device (CPLD), computer hardware, firmware, software, and/or combinations thereof. These various embodiments may include being implemented in one or more computer programs executable and/or interpretable on a programmable system including at least one programmable processor, and the programmable processor may be a special-purpose or general-purpose programmable processor, and may receive data and instructions from a storage system, at least one input device and at least one output device, and may transmit data and instructions to the storage system, the at least one input device, and the at least one output device.

Program code for implementing the methods of the present disclosure may be written in any combination of one or more programming languages. These program codes may be provided to a processor or controller of a general computer, a dedicated computer, or other programmable data processing device, such that the program codes, when executed by the processor or controller, cause the functions and/or operations specified in the flow diagrams and/or block diagrams is performed. The program code can be executed entirely on the machine, partly on the machine, as a stand-alone software package partly on a machine and partly on a remote machine or entirely on a remote machine or server.

In the context of the present disclosure, a machine-readable medium may be a tangible medium that may contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage media include electrical connections based on one or more wires, portable computer disks, hard disks, random access memories (RAM), read-only memories (ROM), erasable programmable read-only memories (EPROM or flash memory), fiber optics, compact disc read-only memories (CD-ROM), optical storage devices, magnetic storage devices, or any suitable combination of the foregoing.

To provide interaction with a user, the systems and techniques described herein may be implemented on a computer having a display device (e.g., a cathode ray tube (CRT) or liquid crystal display (LCD)) for displaying information for the user; and a keyboard and pointing device (e.g., a mouse or trackball) through which a user can provide an input to the computer. Other types of devices can also be used to provide interaction with the user, for example, the feedback provided to the user may be any form of sensory feedback (e.g., visual feedback, auditory feedback, or tactile feedback); and may be in any form (including acoustic input, voice input, or tactile input) to receive the input from the user.

The systems and techniques described herein may be implemented on a computing system that includes back-end components (e.g., as a data server), or a computing system that includes middleware components (e.g., an application server), or a computing system that includes front-end components (e.g., a user computer with a graphical user interface or web browser through which a user can interact with implementations of the systems and techniques described herein), or a computer system including such a backend components, middleware components, front-end components or any combination thereof. The components of the system may be interconnected by any form or medium of digital data communication (e.g., a communication network). Examples of the communication network includes: Local Area Networks (LAN), Wide Area Networks (WAN), the Internet and blockchain networks.

The computer system may include a client and a server. The Client and server are generally remote from each other and usually interact through a communication network. The relationship of the client and the server is generated by computer programs running on the respective computers and having a client-server relationship with each other. The server may be a cloud server, also known as a cloud computing server or a cloud host, which is a host product in the cloud computing service system, and solves the defects of difficult management and weak business expansion in traditional physical hosts and virtual private servers ("VPS" for short). The server may also be a server of a distributed system, or a server combined with a blockchain.

It should be understood that the steps may be reordered, added or deleted by using the various forms of flows shown above. For example, the steps described in the present disclosure may be executed in parallel, sequentially, or in different orders, as long as the desired results of the technical solutions in the present disclosure can be achieved, and no limitation is imposed herein.

The above-mentioned specific embodiments do not limit the scope of protection of the present disclosure. It should be understood by those skilled in the art that various modifications, combinations, sub-combinations and replacements may be made depending on design requirements and other factors. Any modifications, equivalent replacements, and improvements made within the principles of the present disclosure should be included within the protection scope of the present disclosure.

The invention claimed is:

1. A method of deriving a Decoder-side Intra Mode Derivation (DIMD) predictor for respective samples of a coding unit (CU) of a picture, the method comprising:

selecting one or more Intra Angular Prediction Modes (IPMs) in a template area adjacent to the CU;

for each sample of the CU, determining, dependent on a distance of the sample of the CU to the template area, sample-wise blending weights for blending at least the one or more selected IPMs, wherein the CU comprises a plurality of samples, and the sample-wise blending weights vary across different samples of the CU; and generating the DIMD predictor by blending the one or more selected IPMs and a Planar or DC mode using the determined sample-wise blending weights;

wherein the one or more IPMs are selected using IPM statistics determined globally over the entire template area, the template area comprising a plurality of template area regions, wherein the selection is performed globally for the entire CU, or the selection involves a global selection of a set of IPMs for the entire CU, followed by a further region-wise selection out of the set of IPMs for each CU region;

wherein, in case a selected IPM is present only in one of the template area regions, the blending weight of the selected IPM is determined dependent on the distance of a sample in the CU to the adjacent template area region in which the selected IPM is present;

wherein the distance for a sample is determined using only one of the position coordinates of the sample in the CU and only one dimension of the CU.

2. The method of claim 1, wherein the sample-wise blending weights are determined such that the samples of the CU closer to the template area are weighted with a higher IPM contribution, and the samples of the CU further away from the template area are weighted with higher Planar or DC contribution.

3. The method of claim 1, wherein the sample-wise blending weights for the selected IPMs for a sample of the CU are determined by weighting a first value obtained from one or more predefined characteristics associated with the IPMs in accordance with the distance.

4. The method of claim 3, wherein the blending weight for a Planar or DC mode is determined using only the distance.

5. The method of claim 1, wherein the distance for a sample is determined using only a position of the sample in the CU and a size of the CU.

6. The method of claim 1, wherein the one or more IPMs are selected using IPM statistics determined separately over each of a plurality of template area regions of the template area, the plurality of template area regions including a left template area region and an above template area region, wherein the selection involves a region-wise selection out of the separately determined IPMs for each CU region.

7. The method of claim 1, further comprising:

splitting the CU into two or more CU regions, wherein for at least one of the CU regions adjacent to the template area, for each sample of the CU region the sample-wise blending weights for blending at least the one or more selected IPMs are determined dependent on a distance of the sample of the CU region to the template area, and wherein the DIMD predictor is generated using the sample-wise blending weights determined for each CU region.

8. The method of claim 1, wherein only for one or some but not all of the CU regions of the CU the blending weights are determined dependent on a distance of the samples of the respective CU region to the template area, and for each remaining CU region the blending weights for blending at least the one or more selected IPMs are global blending weights determined for the entire CU, or local blending weights determined dependent on an adjacency of the CU region to the template area.

9. A non-transitory computer-readable storage medium storing instructions that, when executed by a computer, cause the computer to carry out a method of deriving a Decoder-side Intra Mode Derivation (DIMD) predictor for respective samples of a coding unit (CU) of a picture, the method comprising:

selecting one or more Intra Angular Prediction Modes (IPMs) in a template area adjacent to the CU;

for each sample of the CU, determining, dependent on a distance of the sample of the CU to the template area, sample-wise blending weights for blending at least the one or more selected IPMs, wherein the CU comprises a plurality of samples, and the sample-wise blending weights vary across different samples of the CU; and generating the DIMD predictor by blending the one or more selected IPMs and a Planar or DC mode using the determined sample-wise blending weights;

wherein the one or more IPMs are selected using IPM statistics determined globally over the entire template area, the template area comprising a plurality of template area regions, wherein the selection is performed globally for the entire CU, or the selection involves a global selection of a set of IPMs for the entire CU, followed by a further region-wise selection out of the set of IPMs for each CU region;

wherein, in case a selected IPM is present only in one of the template area regions, the blending weight of the selected IPM is determined dependent on the distance of a sample in the CU to the adjacent template area region in which the selected IPM is present;

wherein the distance for a sample is determined using only one of the position coordinates of the sample in the CU and only one dimension of the CU.

10. An apparatus for deriving a Decoder-side Intra Mode Derivation (DIMD) predictor for respective samples of a coding unit (CU) of a picture, the apparatus comprising:

a processor; and a memory storing instructions executable by the processor;

wherein the processor is configured to:

select one or more Intra Angular Prediction Modes (IPMs) in a template area adjacent to the CU;

determine, for each sample of the CU, dependent on a distance of the sample of the CU to the template area, sample-wise blending weights for blending at least the one or more selected IPMs, wherein the CU comprises a plurality of samples, and the sample-wise blending weights vary across different samples of the CU; and generate the DIMD predictor by blending the one or more selected IPMs and a Planar or DC mode using the determined sample-wise blending weights;

wherein the one or more IPMs are selected using IPM statistics determined globally over the entire template area, the template area comprising a plurality of template area regions, wherein the selection is performed globally for the entire CU, or the selection involves a global selection of a set of IPMs for the entire CU, followed by a further region-wise selection out of the set of IPMs for each CU region;

wherein, in case a selected IPM is present only in one of the template area regions, the blending weight of the selected IPM is determined dependent on the distance of a sample in the CU to the adjacent template area region in which the selected IPM is present;

wherein the distance for a sample is determined using only one of the position coordinates of the sample in the CU and only one dimension of the CU.

11. The method of claim 8, wherein, for a CU region located not adjacent to the template area, only the Planar mode is selected as the DIMD predictor;

only the DC mode is selected as the DIMD predictor;

the blending weights are determined using the one or more selected IPMs in one or more or all template area regions; or the blending weights are determined by weighting blending weights of a CU region adjacent to a template area region.

12. The apparatus of claim 10, wherein the sample-wise blending weights are determined such that the samples of the CU closer to the template area are weighted with a higher IPM contribution, and the samples of the CU further away from the template area are weighted with higher Planar or DC contribution.

13. The apparatus of claim 10, wherein the sample-wise blending weights for the selected IPMs for a sample of the CU are determined by weighting a first value obtained from one or more predefined characteristics associated with the IPMs in accordance with the distance.

14. The apparatus of claim 13, wherein the blending weight for a Planar or DC mode is determined using only the distance.

15. The apparatus of claim 10, wherein the distance for a sample is determined using only a position of the sample in the CU and a size of the CU.

16. The apparatus of claim 10, wherein the one or more IPMs are selected using IPM statistics determined globally over the entire template area, the template area comprising a plurality of template area regions, wherein the selection is performed globally for the entire CU, or the selection involves a global selection of a set of IPMs for the entire CU, followed by a further region-wise selection out of the set of IPMs for each CU region.

17. The apparatus of claim 10, wherein the one or more IPMs are selected using IPM statistics determined separately over each of a plurality of template area regions of the template area, the plurality of template area regions including a left template area region and an above template area region, wherein the selection involves a region-wise selection out of the separately determined IPMs for each CU region.

* * * * *